US012641157B2

(12) United States Patent
Han et al.

(10) Patent No.: US 12,641,157 B2
(45) Date of Patent: May 26, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jiwon Han, Suwon-si (KR); Saeeap Kim, Suwon-si (KR); Jeongchoul Park, Suwon-si (KR); Jongwoon Park, Suwon-si (KR); Hyungseon Song, Suwon-si (KR); Heekyung Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 18/100,241

(22) Filed: Jan. 23, 2023

(65) Prior Publication Data

US 2023/0154464 A1     May 18, 2023

Related U.S. Application Data

(63) Continuation of application No. PCT/KR2021/006995, filed on Jun. 4, 2021.

(30) Foreign Application Priority Data

Jul. 29, 2020    (KR) ........................ 10-2020-0094771

(51) Int. Cl.
    *H04L 67/125*       (2022.01)
    *G10L 15/22*        (2006.01)
            (Continued)

(52) U.S. Cl.
    CPC ............ *H04L 67/125* (2013.01); *G10L 15/22* (2013.01); *G10L 15/30* (2013.01); *H04L 12/2821* (2013.01)

(58) Field of Classification Search
    USPC ..................................................... 704/1–504
    See application file for complete search history.

(56) References Cited

U.S. PATENT DOCUMENTS

| | | | | |
|---|---|---|---|---|
| 8,621,049 B2* | 12/2013 | Ebrom | ................. | H04L 63/105 |
| | | | | 709/222 |
| 8,624,728 B2* | 1/2014 | Karaoguz | ............ | H04N 21/436 |
| | | | | 340/12.31 |

(Continued)

FOREIGN PATENT DOCUMENTS

| | | |
|---|---|---|
| EP | 3 115 905 A1 | 1/2017 |
| EP | 3 657 089 A1 | 5/2020 |

(Continued)

OTHER PUBLICATIONS

Communication dated Oct. 9, 2023 issued by European Patent Office in European Patent Application No. 21848994.6.

(Continued)

*Primary Examiner* — Marcus T Riley
(74) *Attorney, Agent, or Firm* — Sughrue Mion, PLLC

(57) ABSTRACT

An electronic apparatus is provided. The electronic apparatus includes: a memory configured to store first information on a plurality of home appliances included in an Internet of Things (IoT) network and second information on a plurality of spaces in which the plurality of home appliances are located; a communication interface; and a processor configured to: based on a user command for controlling a first home appliance among the plurality of home appliances being received, identify, based on the first information, a first space in which the first home appliance is located, identify, based on the second information, space information of the first space, and control the communication interface to transmit a control signal for controlling the first home appliance to the first home appliance based on control (Continued)

information included in the user command and the space information of the first space.

13 Claims, 21 Drawing Sheets

(51) Int. Cl.
*G10L 15/30* (2013.01)
*H04L 12/28* (2006.01)

(56) References Cited

U.S. PATENT DOCUMENTS

| | | | | |
|---|---|---|---|---|
| 9,826,365 | B2 * | 11/2017 | Ko | H04L 67/34 |
| 9,946,288 | B2 * | 4/2018 | Sato | G05F 1/66 |
| 10,845,081 | B2 * | 11/2020 | Lee | G05B 15/02 |
| 10,901,380 | B2 * | 1/2021 | Kim | G10L 15/00 |
| 11,275,348 | B2 * | 3/2022 | Park | G06F 16/288 |
| 11,356,512 | B2 * | 6/2022 | Um | H04L 67/303 |
| 11,360,447 | B2 * | 6/2022 | Park | H04L 67/12 |
| 11,774,930 | B2 * | 10/2023 | Park | G06N 5/043 |
| | | | | 706/10 |
| 11,778,030 | B2 * | 10/2023 | Park | G06F 16/288 |
| | | | | 709/230 |
| 11,994,833 | B2 * | 5/2024 | Park | G06N 20/00 |
| 2015/0195101 | A1 * | 7/2015 | Rashid | G08C 17/02 |
| | | | | 700/90 |
| 2016/0047568 | A1 * | 2/2016 | Chan | F24F 11/52 |
| | | | | 62/132 |
| 2016/0161964 | A1 * | 6/2016 | Sato | G05F 1/66 |
| | | | | 700/297 |
| 2016/0174043 | A1 * | 6/2016 | Ko | H04W 4/026 |
| | | | | 455/456.1 |
| 2016/0198001 | A1 * | 7/2016 | Um | H04L 67/125 |
| | | | | 709/205 |
| 2016/0277204 | A1 * | 9/2016 | Kang | H04L 12/2816 |
| 2016/0314682 | A1 * | 10/2016 | Jun | G08B 21/24 |
| 2017/0187658 | A1 * | 6/2017 | Ryu | H04L 51/10 |
| 2019/0208020 | A1 * | 7/2019 | Um | H04L 67/52 |
| 2019/0341042 | A1 * | 11/2019 | Kim | H04L 67/12 |
| 2019/0353379 | A1 * | 11/2019 | Lee | F24F 11/50 |
| 2019/0361411 | A1 * | 11/2019 | Park | H04L 67/12 |
| 2019/0361412 | A1 * | 11/2019 | Park | G06F 16/288 |
| 2019/0369577 | A1 * | 12/2019 | Kim | H04L 12/2816 |
| 2020/0133213 | A1 * | 4/2020 | Park | H04L 12/2827 |
| 2020/0348662 | A1 * | 11/2020 | Cella | G05B 23/0294 |
| 2022/0043410 | A1 * | 2/2022 | Park | G06N 5/043 |
| 2022/0083048 | A1 * | 3/2022 | Cella | G05B 23/0294 |
| 2022/0303341 | A1 * | 9/2022 | Um | H04L 67/303 |
| 2022/0365498 | A1 * | 11/2022 | Park | H04L 12/2823 |
| 2023/0154464 | A1 * | 5/2023 | Han | H04L 12/2821 |
| | | | | 704/270 |
| 2024/0103467 | A1 * | 3/2024 | Park | G05B 15/02 |

FOREIGN PATENT DOCUMENTS

| | | | | | |
|---|---|---|---|---|---|
| EP | 3664974 | B1 * | 10/2022 | | B25J 19/023 |
| JP | 2019-27602 | A | 2/2019 | | |
| KR | 10 2009 0076718 | A | 7/2009 | | |
| KR | 10-2015-0014618 | A | 2/2015 | | |
| KR | 10-2015-0051514 | A | 5/2015 | | |
| KR | 10-1543651 | B1 | 8/2015 | | |
| KR | 10-2016-0066292 | A | 6/2016 | | |
| KR | 10-2016-0083760 | A | 7/2016 | | |
| KR | 10-2018-0015301 | A | 2/2018 | | |
| KR | 10-2018-0049830 | A | 5/2018 | | |
| KR | 10 2019 0063151 | A | 6/2019 | | |
| KR | 10-2019-0097393 | A | 8/2019 | | |
| KR | 10-2019-0128823 | A | 11/2019 | | |
| WO | WO-2022025408 | A1 * | 2/2022 | | G10L 15/22 |

OTHER PUBLICATIONS

International Search Report dated Sep. 23, 2021, issued by the International Searching Authority in International Application No. PCT/KR2021/006995 (PCT/ISA/210).

Written Opinion dated Sep. 23, 2021, issued by the International Searching Authority in International Application No. PCT/KR2021/006995 (PCT/ISA/237).

Communication dated Sep. 22, 2025 issued by the Korean Intellectual Property Office in Korean Patent Application No. 10-2020-0094771.

* cited by examiner

| | ID | USE | TEMPERATURE (℃) | HUMIDITY (%) | FINE DUST CONCENTRATION (㎍/㎥) |
|---|---|---|---|---|---|
| Space 1 | #01 | KID'S ROOM | 27 | 60 | 5 |
| Space 2 | #02 | BEDROOM | 25 | 60 | 10 |
| Space 3 | #03 | LIVING ROOM | 24 | 70 | 20 |
| Space 4 | #04 | KITCHEN | 24 | 70 | 50 |
| Space 5 | #05 | BATHROOM | 28 | 50 | 20 |

1010

| | ID | USE | APPARATUS 1 | APPARATUS 2 | APPARATUS 3 |
|---|---|---|---|---|---|
| Space 1 | #01 | KID'S ROOM | AIR CONDITIONER | TV | |
| Space 2 | #02 | BEDROOM | AIR CONDITIONER | TV | |
| Space 3 | #03 | LIVING ROOM | AIR CONDITIONER | TV | CIRCULATOR |
| Space 4 | #04 | KITCHEN | VENTILATOR | REFRIGERATOR | |
| Space 5 | #05 | BATHROOM | VENTILATOR | TV | |

| | ID | USE | SET TEMPERATURE (°C) | CURRENT TEMPERATURE (°C) |
|---|---|---|---|---|
| Space 1 | #01 | KID'S ROOM | 24 | 27 |
| Space 2 | #02 | BEDROOM | 24 | 24 |
| Space 3 | #03 | LIVING ROOM | 24 | 24 |
| Space 4 | #04 | KITCHEN | 25 | 30 |
| Space 5 | #05 | BATHROOM | 30 | 30 |

FIG. 17

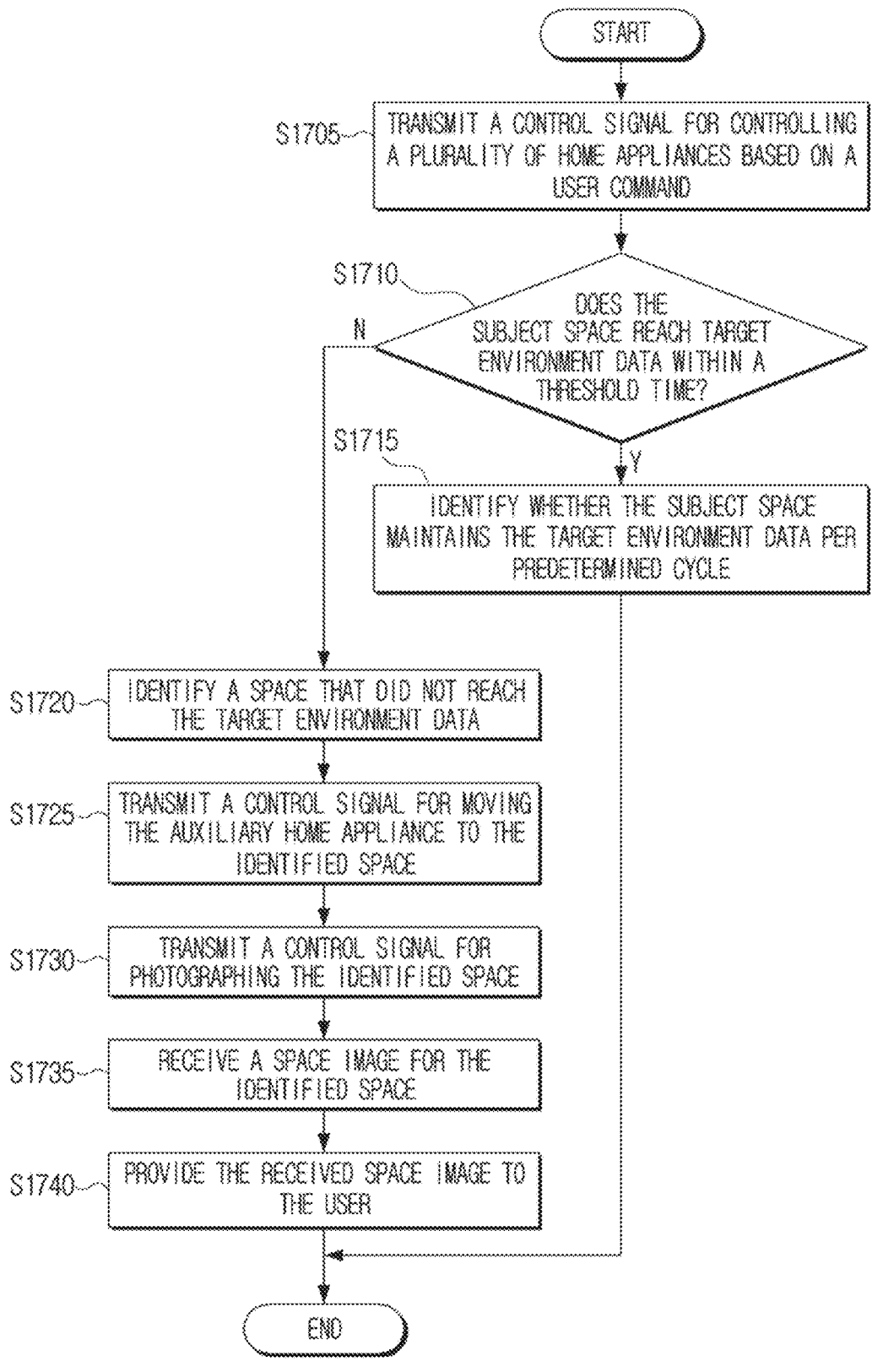

START

S1705 — TRANSMIT A CONTROL SIGNAL FOR CONTROLLING A PLURALITY OF HOME APPLIANCES BASED ON A USER COMMAND

S1710 — DOES THE SUBJECT SPACE REACH TARGET ENVIRONMENT DATA WITHIN A THRESHOLD TIME?

N

Y

S1715 — IDENTIFY WHETHER THE SUBJECT SPACE MAINTAINS THE TARGET ENVIRONMENT DATA PER PREDETERMINED CYCLE

S1720 — IDENTIFY A SPACE THAT DID NOT REACH THE TARGET ENVIRONMENT DATA

S1725 — TRANSMIT A CONTROL SIGNAL FOR MOVING THE AUXILIARY HOME APPLIANCE TO THE IDENTIFIED SPACE

S1730 — TRANSMIT A CONTROL SIGNAL FOR PHOTOGRAPHING THE IDENTIFIED SPACE

S1735 — RECEIVE A SPACE IMAGE FOR THE IDENTIFIED SPACE

S1740 — PROVIDE THE RECEIVED SPACE IMAGE TO THE USER

END

2005

1

ELECTRONIC APPARATUS AND CONTROLLING METHOD THEREOF

CROSS-REFERENCE TO RELATED APPLICATIONS

This application is a by-pass continuation of International Application No. PCT/KR2021/006995, filed on Jun. 4, 2021, which is based on and claims priority to Korean Patent Application No. 10-2020-0094771, filed on Jul. 29, 2020, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus controlling an Internet of Things (IoT) network, and a controlling method thereof.

2. Description of Related Art

A plurality of home appliances included in an IoT network may be registered in a server in advance. To control the plurality of home appliances registered in the server, a user may directly use a terminal apparatus. The server may register a plurality of home appliances in advance, and transmit control signals to the registered home appliances based on control commands of the user.

The server may store map information for spaces in which the IoT network is implemented. For example, the server may store information on structures of spaces in which the plurality of home appliances are installed.

However, the information on the spaces stored in the server is merely structural information, and may be information for movements regarding movable apparatuses. Accordingly, in the case of intending to control various home appliances based on the structural information for spaces, there is a problem that the characteristics of each space cannot be reflected. For example, in the case of controlling home appliances uniformly for a space of which use is different or a space that is not ventilated structurally, a problem that the space does not reach an environment that the user wants, or energy efficiency becomes lower may occur.

Also, in the case of applying a predefined set value uniformly to a plurality of home appliances, the set value does not suit the uses of the plurality of respective spaces, and thus a problem that energy is wasted may occur.

In addition, in case a user directly inputs set values or control commands for the plurality of respective home appliances for resolving the aforementioned problems, a problem that the user's convenience is reduced may occur.

SUMMARY

Provided are an electronic apparatus that transmits a control signal based on space information of a space corresponding to a user command, and a controlling method thereof.

According to an aspect of the disclosure, an electronic apparatus includes: a memory configured to store first information on a plurality of home appliances included in an Internet of Things (IoT) network and second information on a plurality of spaces in which the plurality of home appliances are located; a communication interface; and a processor configured to: based on a user command for controlling a first home appliance among the plurality of home appliances being received, identify, based on the first information, a first space in which the first home appliance is located, identify, based on the second information, space information of the first space, and control the communication interface to transmit a control signal for controlling the first home appliance to the first home appliance based on control information included in the user command and the space information of the first space.

The processor may be further configured to: identify, based on the user command, a second home appliance performing a function related to the first home appliance, among the plurality of home appliances, identify, based on the first information, a second space in which the second home appliance is located, identify, based on the second information, space information of the second space, and control the communication interface to transmit a control signal for controlling the second home appliance to the second home appliance based on control information included in the user command and the space information of the second space.

The processor may be further configured to, based on user occupancy information being received, identify a second space in which a user is located based on the user occupancy information, and based on identifying that the first space and the second space are the same space, control the communication interface to transmit a control signal for controlling the first home appliance to the first home appliance based on control information included in the user command, the space information of the first space, and information of the user.

The space information may include at least one of structure information of the plurality of spaces, arrangement information of the plurality of home appliances, or use information of the plurality of spaces.

The first home appliance may be an air conditioner, and the processor may be further configured to control the communication interface to transmit a control signal for controlling at least one of a driving mode, a blowing direction, or blowing strength of the air conditioner to the air conditioner based on the structure information of the first space.

The memory may be further configured to store power efficiency information of the plurality of home appliances, and the processor may be further configured to: identify a second space in which a second home appliance having a power efficiency that is less than or equal to a threshold value among the plurality of home appliances, identify a third home appliance performing a function related to the second home appliance among home appliances located in spaces adjacent to the second space, and control the communication interface to transmit a control signal for controlling the third home appliance to the third home appliance based on space information of the second space and driving state information of the second home appliance.

The processor may be further configured to: based on identifying that integrated control with another home appliance other than the first home appliance is needed based on the space information of the first space, identify a second home appliance that is movable and performs a function related to the first home appliance among the plurality of home appliances, and control the communication interface to transmit a control signal for controlling the second home appliance to the second home appliance based on the space information of the first space and driving state information of the first home appliance.

The processor may be further configured to control the communication interface to transmit a control signal for moving the second home appliance within a range of a threshold distance from the first space to the second home appliance based on the space information of the first space and location information of the second home appliance.

The processor may be further configured to, based on environment data of the first space not reaching environment data corresponding to the control signal within a threshold time, identify that integrated control with another home appliance other than the first home appliance is needed.

The processor may be further configured to: control the communication interface to transmit a control signal for moving the second home appliance within a range of a threshold distance from the first space to the second home appliance based on the space information of the first space and location information of the second home appliance, control the communication interface to transmit a control signal for photographing the first space to the second home appliance, and based on receiving a photographed image from the second home appliance, control the communication interface to transmit the photographed image to a user terminal.

According to an aspect of the disclosure, a method of controlling an electronic apparatus storing first information on a plurality of home appliances included in an Internet of Things (IoT) network and second information on a plurality of spaces in which the plurality of home appliances are located, includes: based on a user command for controlling a first home appliance among the plurality of home appliances being received, identifying a first space in which the first home appliance is located based on of the first information; identifying, based on the second information, space information of the first space; and transmitting a control signal for controlling the first home appliance to the first home appliance based on control information included in the user command and the space information of the first space.

The method may further include: identifying, based on the user command, a second home appliance performing a function related to the first home appliance among the plurality of home appliances; identifying, based on the first information, a second space in which the second home appliance is located; identifying, based on the second information, space information of the second space; and transmitting a control signal for controlling the second home appliance to the second home appliance based on control information included in the user command and the space information of the second space.

The method may further include: based on user occupancy information being received, identifying a second space in which a user is located based on the user occupancy information, and the transmitting the control signal to the first home appliance may include, based on identifying that the first space and the second space are the same space, transmitting a control signal for controlling the first home appliance to the first home appliance based on control information included in the user command, the space information of the first space, and the information of the user.

The space information of the first space may include at least one of structure information of the plurality of spaces, arrangement information of the plurality of home appliances, or use information of the plurality of spaces.

The first home appliance may be an air conditioner, and the method may further include: transmitting a control signal for controlling at least one of a driving mode, a blowing direction, or blowing strength of the air conditioner to the air conditioner based on the structure information of the first space.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram for illustrating information corresponding to a plurality of respective spaces;

FIG. 14 is a table for illustrating an operation of identifying whether integrated control is needed based on environment data for each space;

FIG. 17 is a diagram for illustrating an operation of obtaining a photographed image through an auxiliary home appliance in case target data is not reached within a threshold time;

DETAILED DESCRIPTION

Figure 1:
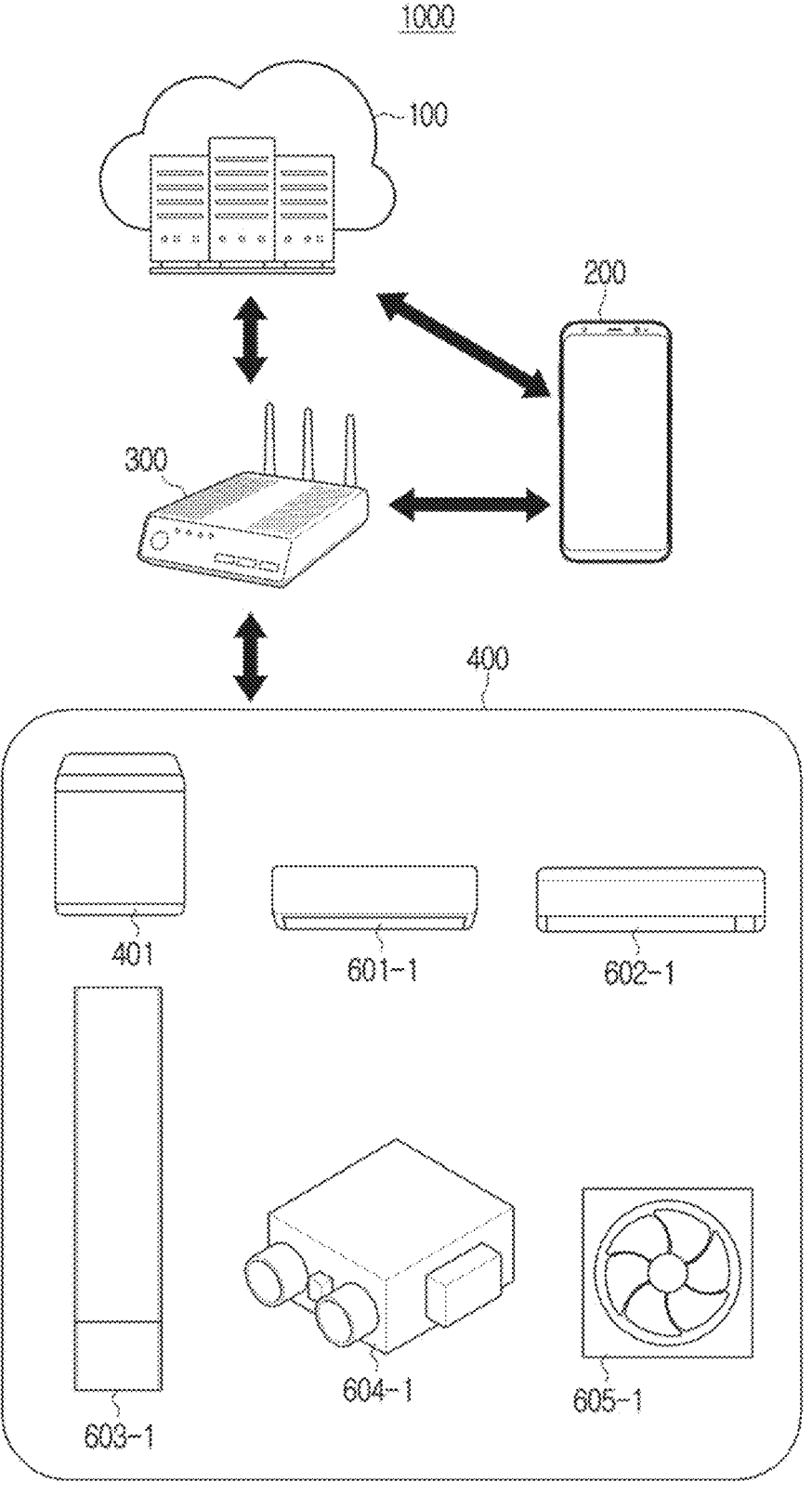
FIG. 1 is a diagram for illustrating a system controlling a plurality of home appliances.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" should be construed as denoting that there are such characteristics (e.g., elements such as numerical values, functions, operations, and components), and the expressions are not intended to exclude the existence of additional characteristics.

In addition, the expression "at least one of A or B" should be interpreted to mean any one of only "A", only "B" or both "A and B."

Further, the expressions "first," "second," and the like used in this specification may be used to describe various elements regardless of any order and/or degree of importance. Also, such expressions are used only to distinguish one element from another element, and are not intended to limit the elements.

Also, the description in the disclosure that one element (e.g., a first element) is "(operatively or communicatively) coupled with/to" or "connected to" another element (e.g., a second element) should be interpreted to include both the case where the one element is directly coupled to the other element, and the case where the one element is coupled to the other element through still another element (e.g., a third element).

In addition, singular expressions include plural expressions, unless defined obviously differently in the context. Also, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

Also, in this specification, the term "user" may refer to a person who uses an electronic apparatus or an apparatus using an electronic apparatus (e.g., an artificial intelligence electronic apparatus).

Hereinafter, an embodiment of the disclosure will be described in more detail with reference to the accompanying drawings.

FIG. 1 is a diagram for illustrating a system controlling a plurality of home appliances.

Referring to FIG. 1, a system 1000 controlling a plurality of home appliances may include an electronic apparatus 100, a user terminal 200, an access point (AP) apparatus 300, and a plurality of home appliances 401, 601-1 to 605-2 included in an IoT network 400.

Here, the electronic apparatus 100 may be a server communicating with the IoT network 400. For example, the IoT network 400 may include the plurality of home appliances 401, 601-1 to 605-2. Also, the plurality of home appliances 401, 601-1 to 605-2 included in the IoT network 400 may transmit and receive information with the electronic apparatus 100 through the AP apparatus 300. Here, the AP apparatus 300 may be a router.

The user terminal 200 may control the plurality of home appliances 401, 601-1 to 605-2 included in the IoT network 400 through the electronic apparatus 100.

The user terminal 200 according to an embodiment may perform communication with the electronic apparatus 100 based on a user command by using a wireless communication module through the electronic apparatus 100, and transmit the user command to the plurality of home appliances 401, 601-1 to 605-2 through the electronic apparatus 100. The user terminal 200 may transmit the user command to the electronic apparatus 100, and the electronic apparatus 100 may transmit the user command received from the user terminal 200 to the AP apparatus 300, and the AP apparatus 300 may transmit the received user command to the plurality of home appliances 401, 601-1 to 605-2. Here, the user terminal 200 may transmit the user command directly to the electronic apparatus 100, or transmit the user command through the AP apparatus 300. In contrast, the user terminal 200 may directly receive information related to the plurality of home appliances 401, 601-1 to 605-2 through the electronic apparatus 100, or receive the information through the AP apparatus 300.

According to another embodiment, the user terminal 200 may directly transmit a user command to the plurality of home appliances 401, 601-1 to 605-2, rather than via the electronic apparatus 100. Here, the user terminal 200 may use the same AP apparatus 300 as the plurality of home appliances 401, 601-1 to 605-2 included in the IoT network 400. For example, the user terminal 200 may transmit the user command to the plurality of home appliances 401, 601-1 to 605-2 through the AP apparatus 300. Then, the user terminal 200 may receive information related to the plurality of home appliances 401, 601-1 to 605-2 through the AP apparatus 300.

Home appliances included in the IoT network 400 may be in various types.

The home appliance 401 may mean a circulator. The home appliance 401 may mean an auxiliary home appliance, and it may be a movable apparatus. Also, the blowing direction and the blowing strength of the home appliance 401 may be controlled by a control signal.

The home appliance 601-1 and the home appliance 602-1 may be wall-mounted type air conditioners. The home appliance 603-1 may be a stand-type air conditioner. The home appliance 604-1 may be a heat exchanger. The home appliance 605-1 may be a ventilator. That is, the plurality of home appliances 401, 601-1 to 605-2 may be controlled by a user command received from the AP apparatus 300. Here, the user command may be generated by the user terminal 200. The plurality of home appliances 401, 601-1 to 605-2 may be connected with the electronic apparatus 100, and transmit and receive information.

Figure 2:
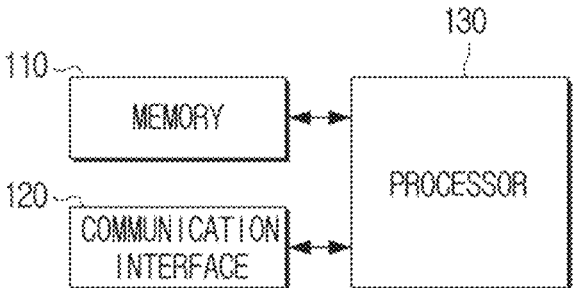
FIG. 2 is a block diagram illustrating an electronic apparatus according to an embodiment of the disclosure.

FIG. 2 is a block diagram illustrating an electronic apparatus according to j embodiment of the disclosure.

Referring to FIG. 2, the electronic apparatus 100 may include a memory 110, a communication interface 120, and a processor 130.

The electronic apparatus 100 may be a server that can control the IoT network. The electronic apparatus according to various embodiments of this specification may include, for example, at least one of a desktop personal computer (PC), a laptop PC, a tablet PC, a smartphone, a mobile phone, a personal digital assistant (PDA), or a portable multimedia player (PMP).

The memory 110 may be an internal memory such as a read-only memory (ROM) (e.g., an electrically erasable programmable read-only memory (EEPROM)) and a random access memory RAM included in the processor 130, or may be a separate memory from the processor 130. In this case, the memory 110 may be a memory embedded in the electronic apparatus 100, or a memory that can be attached to or detached from the electronic apparatus 100 according to the use of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

In the case of a memory embedded in the electronic apparatus 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EE-PROM), a mask ROM, a flash ROM, a flash memory (e.g., NAND flash or NOR flash, etc.), a hard drive, or a solid state drive (SSD)). Also, in the case of a memory that can be attached to or detached from the electronic apparatus 100, the memory may be implemented as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The memory 110 may store first information on the plurality of home appliances 401, 601-1 to 605-2 included in the IoT network 400, and second information on a plurality of spaces in which the plurality of home appliances 401, 601-1 to 605-2 are located.

Here, the IoT network 400 may include the plurality of home appliances 401, 601-1 to 605-2. Specifically, the plurality of home appliances 401, 601-1 to 605-2 may be registered in the electronic apparatus 100 managing the IoT network 400, and a user may control the plurality of home appliances 401, 601-1 to 605-2 through the electronic apparatus 100.

Here, the first information may be home appliance information. The home appliance information may mean identification information for each of the plurality of home appliances 401, 601-1 to 605-2. Also, the home appliance information may include at least one of identification information of the home appliances, location information of the home appliances, or power efficiency information of the home appliances.

The second information may mean space information for the plurality of spaces. The space information may mean information related to a subject space to be controlled by a user. The information related to a subject space may include at least one of the structure of the subject space, the use of the subject space, or a target set value of the subject space. The home appliance information may include at least one of identification information of the home appliances, location information of the home appliances, or power efficiency information of the home appliances.

The communication interface 120 is a component performing communication with various types of external apparatuses according to various types of communication methods. The communication interface 120 includes a Wi-Fi module, a Bluetooth module, an infrared communication module, and a wireless communication module, etc. Here, each communication module may be implemented in the form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID or a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc.

Other than the above, the communication interface 120 may include at least one of a Local Area Network (LAN) module, an Ethernet module, or a wired communication module that performs communication by using a pair cable, a coaxial cable, an optical fiber cable, or an Ultra Wide-Band (UWB) module, etc.

According to an embodiment, the communication interface 120 may use the same communication module (e.g., a Wi-Fi module) for communicating with an external apparatus like a remote control and an external server.

According to another embodiment, the communication interface 120 may use a different communication module (e.g., a Wi-Fi module) for communicating with an external apparatus like a remote control and an external server. For example, the communication interface 120 may use at least one of an Ethernet module or a Wi-Fi module for communicating with an external server, and use a BT module for communicating with an external apparatus like a remote control. However, this is merely an example, and the communication interface 120 may use at least one communication module among various communication modules in the case of communicating with a plurality of external apparatuses or external servers.

The electronic apparatus 100 may perform communication with various kinds of external apparatuses by using the communication interface 120. Here, external apparatuses may include a display apparatus like a TV, an image processing apparatus like a set-top box, an external server, a control apparatus like a remote control, an audio outputting apparatus like a Bluetooth speaker, a lighting apparatus, a smart bulb, a smart plug, a smart cleaner, a home appliance like a smart refrigerator, a server like an IoT home manager, etc.

The processor 130 may perform overall control operations of the electronic apparatus 100. Specifically, the processor 130 performs a function of controlling the overall operations of the electronic apparatus 100.

The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). The processor 130 may perform various functions by executing computer executable instructions stored in the memory 110.

If a user command for controlling the first home appliance among the plurality of home appliances 401, 601-1 to 605-2 is received, the processor 130 may identify a first space in which the first home appliance is located based on the first information, identify space information of the identified first space based on the second information, and control the communication interface 120 to transmit a control signal for controlling the first home appliance to the first home appliance based on control information included in the user command and the space information of the identified first space.

Here, a user command may be a command for controlling one home appliance (the first home appliance) among the plurality of home appliances 401, 601-1 to 605-2. Accordingly, when a user command is received, the processor 130 may identify the first space in which the first home appliance corresponding to the user command is located based on identification information for each of the plurality of home appliances 401, 601-1 to 605-2 and location information for each of the plurality of home appliances 401, 601-1 to 605-2.

Here, the processor 130 may identify space information of the identified first space. The space information may mean the unique characteristic information of the space. For example, the space information of the first space may be a kid's room. For a kid's room, an appropriate temperature, appropriate humidity, and appropriate fine dust concentration may exist, and there may be a high need for controlling the room to a different environment from adults. Accordingly, the space information may include information of a content that the first space is a kid's room.

Here, the information included in the user command may mean a driving mode, and target environment data (a target set value) corresponding to the driving mode. Here, if the driving mode is cooling, the target environment data may mean a target temperature, and if the driving mode is dehumidification, the target environment data may mean target humidity, and if the driving mode is air purification, the target environment data may mean target fine dust concentration.

The processor 130 may consider both the control information included in the user command and the space information of the first space stored in advance in the memory 110 in controlling the first home appliance. For example, the processor 130 may identify a subject home appliance, a subject space, a subject driving mode, and target environment data included in the user command. Then, the processor 130 may obtain the pre-stored space information of the first space. Then, the processor 130 may change the target environment data based on the obtained space information of the first space. For example, it is assumed that the user input a command for controlling the first home appliance by setting the temperature to 22 degrees, and the user command was received by the electronic apparatus 100. Here, even though the user command is for controlling the first space including the first home appliance to 22 degrees, the processor 130 may automatically change the target environment data to 25 degrees but not 22 degrees, as the first space falls under a kid's room.

Accordingly, the processor 130 may partially change the control information including the user command based on the space information of the identified first space. Then, the processor 130 may generate a control signal for controlling the first home appliance based on the changed control information. Then, the processor 130 may transmit the generated control signal to the first home appliance through the communication interface 120. Here, the operation of the processor 130 of transmitting the generated control signal to the first home appliance may mean an operation that the generated control signal is transmitted to the first home appliance through the AP apparatus 300.

If a user command for controlling one home appliance is received, the electronic apparatus 100 according to an embodiment may control only the first home appliance corresponding to the user command.

If a user command for controlling one home appliance is received, the electronic apparatus 100 according to another embodiment may control the first home appliance corresponding to the user command and a second home appliance different from the first home appliance together.

Based on the received user command, the processor 130 may identify a second home appliance performing a function related to the first home appliance among the plurality of home appliances 401, 601-1 to 605-2, identify a second space in which the second home appliance is located based on the first information, identify space information of the identified second place based on the second information, and control the communication interface 120 to transmit a control signal for controlling the second home appliance to the second home appliance based on control information included in the user command and the space information of the identified second space.

Here, the function related to the first home appliance may mean a function in an identical technical field or a similar technical field to the first home appliance. For example, if the first home appliance is an air conditioner, the function related to the air conditioner may be cooling, and may be controlling the air. Accordingly, the function related to the air conditioner may mean at least one of cooling, dehumidification, removal of fine dust, or ventilation. Also, the second home appliance performing the function related to the air conditioner may be an air conditioner, a dehumidifier, an air purifier, and a ventilator. Further, the second home appliance may mean a heat exchanger other than the above.

If a user command for controlling the first home appliance located in the first space is received, the processor 130 may generate a control signal for additionally controlling the second home appliance other than the first home appliance. Specifically, the processor 130 may identify the second home appliance performing a function related to the first home appliance near the first space in which the first home appliance is located. Then, the processor 130 may identify the second space based on the location information of the identified second home appliance. Then, the processor 130 may identify space information of the identified second space. Here, the processor 130 may determine how to control the second home appliance based on the user command and the space information of the second space. For example, if the user command is for setting the first space to 22 degrees, the processor 130 may generate a control signal for controlling the second home appliance such that the second space can also be set to 22 degrees, and transmit the generated control signal to the second home appliance.

The processor 130 may simultaneously control the first home appliance and the second home appliance based on the user command for the first home appliance. This is because the first space and the second space are adjacent, and as long as the spaces are not physically divided, it may be difficult to control only the first space to 22 degrees due to air circulation.

If user occupancy information is received, the processor 130 may identify a third space in which the user is located based on the received user occupancy information, and if the first space and the third space are identified as the same space, the processor 130 may control the communication interface 120 to transmit a control signal for controlling the first home appliance to the first home appliance based on control information included in the user command, the space information of the identified first space, and the user's information.

The user occupancy information may mean information indicating whether the user is located in a specific space. The processor 130 may determine whether a space is occupied by the user through at least one home appliance that can determine whether a space is occupied by the user among the plurality of home appliances 401, 601-1 to 605-2 included in the IoT network 400. Specifically, a home appliance including a camera or an object recognition sensor among the plurality of home appliances 401, 601-1 to 605-2 may determine whether a space is occupied by the user. The home appliance that determined whether a space is occupied by the user may transmit the determination result to the electronic apparatus 100.

Here, the processor 130 may obtain the user occupancy information by using a movable auxiliary home appliance 401. Specifically, the auxiliary home appliance 401 may include a camera or an object recognition sensor, and the auxiliary home appliance 401 may determine whether a space is occupied by the user based on data obtained from the camera or the object recognition sensor.

The processor 130 may identify in which space the user is currently located. Also, if the space in which the user is actually located is the same as the space corresponding to the user command, the processor 130 may generate a control signal for controlling the first home appliance based on control information included in the user command, the space information of the first space, or the user's information. Here, the user information may mean the unique characteristic information of the user. For example, in case the user is a kid, characteristic information that the user hates a very cold environment may be stored in the memory 110. Also, if it is identified that a pre-registered kid is occupying the space, the processor 130 may control the home appliance based on the characteristic information of the kid.

Detailed explanation regarding whether a space is occupied by a user will be described below in FIG. 11 and FIG. 12.

The space information may include at least one of the structure information of the plurality of spaces, the arrangement information of the plurality of home appliances 401, 601-1 to 605-2, or the use information of the plurality of spaces.

Here, the structure information may be information indicating in which forms the plurality of spaces are constituted, and in which structures the spaces are divided. Also, the arrangement information of the plurality of home appliances 401, 601-1 to 605-2 may be coordinate information indicating in which locations the home appliances are installed. In addition, the use information of the plurality of spaces may mean information indicating the main uses of the respective spaces. For example, the uses may include at least one of a living room, a kitchen, a bathroom, or a kid's room.

The first home appliance may be an air conditioner, and the processor 130 may control the communication interface 120 to transmit a control signal for controlling at least one of the driving mode, the blowing direction, or the blowing strength of the air conditioner to the air conditioner based on the structure information of the first space.

The first home appliance may be installed in the first space among the plurality of spaces. Here, the processor 130 may automatically control the first home appliance based on the structure information of the first space. The operation of controlling the home appliance based on the structure information may mean determining a detailed control operation based on the size and the structure of the first space after receiving a user command.

For example, it is assumed that the electronic apparatus 100 received a command for the first home appliance to operate in the target temperature 22 degrees. If the size of the first space in which the first home appliance is located is greater than or equal to a threshold value, the processor 130 may determine the first home appliance to 'a turbo cooling mode,' determine the blowing direction to 'moving in up, down, left, and right directions,' and determine the blowing strength as 'strong.'

The memory 110 may further store power efficiency information of the plurality of home appliances 401, 601-1 to 605-2, and the processor 130 may identify a space in which a third home appliance of which power efficiency is smaller than or equal to a threshold value is located among the plurality of home appliances 401, 601-1 to 605-2, and identify a fourth home appliance performing a function related to the third home appliance among home appliances located in spaces adjacent to the identified space, and control the communication interface 120 to transmit a control signal for controlling the fourth home appliance to the fourth home appliance based on space information of the identified space and driving state information of the third home appliance.

Here, the power efficiency information may be information indicating how much energy efficiency a home appliance has regarding power that is consumed during a specific time. The processor 130 may identify the third home appliance of which power efficiency is smaller than or equal to the threshold value among the plurality of home appliances 401, 601-1 to 605-2. Then, the processor 130 may identify the space in which the identified third home appliance is located. Then, the processor 130 may identify the fourth home appliance performing a similar function to the third home appliance among home appliances located in spaces adjacent to the identified space.

For example, it is assumed that the power efficiency of the third home appliance located in the third space is smaller than or equal to the threshold value. Accordingly, in the case of making only the third home appliance operate in a general operation, a problem that power consumption increases may occur. Accordingly, the processor 130 may identify the fourth home appliance that is located in an adjacent space to the third home appliance, and can perform a similar function. Here, the fourth home appliance may be a different home appliance from the third home appliance. The processor 130 may complement the third home appliance having low power efficiency by controlling not only the third home appliance, but also the fourth home appliance together.

Detailed explanation related to power efficiency will be described below in FIG. 15.

If it is identified that integrated control with another home appliance other than the first home appliance is needed based on the space information of the first space, the processor 130 may identify a fifth home appliance that is movable and performs a function related to the first home appliance among the plurality of home appliances 401, 601-1 to 605-2, and control the communication interface 120 to transmit a control signal for controlling the fifth home appliance to the fifth home appliance based on the space information of the first space and driving state information of the first home appliance.

Here, integrated control may be additionally controlling another home appliance together, other than a home appliance corresponding to a user command. Here, if the first home appliance is one of an air conditioner, a dehumidifier, an air purifier, a ventilator, or a heat exchanger, the fifth home appliance for integrated control may be one of an air conditioner, a dehumidifier, an air purifier, a ventilator, or a heat exchanger that are movable.

Here, the driving state information may include at least one of a driving mode determined to perform a control operation corresponding to a user command, target environment data (a target set value) corresponding to the driving mode, or current environment data (a sensed value).

Specifically, the fifth home appliance may be the auxiliary home appliance 401, and detailed explanation in this regard will be described below in FIG. 8, FIG. 9, and FIG. 15 to FIG. 19.

The processor 130 may control the communication interface 120 to transmit a control signal for moving the fifth home appliance within a range of a threshold distance from the first space to the fifth home appliance based on the space information of the first space and location information of the fifth home appliance.

If it is determined that integrated control for the first home appliance located in the first space is needed, the processor 130 may transmit a control signal for making the fifth home appliance (the auxiliary home appliance 401) move and perform an auxiliary operation of circulating air. Detailed explanation in this regard will be described below in FIG. 19.

In case the environment data of the first space does not reach the environment data corresponding to the control signal within a threshold time, the processor 130 may determine that integrated control with another home appliance other than the first home appliance is needed.

Detailed explanation in this regard will be described below in FIG. 16.

The processor 130 may control the communication interface 120 to transmit a control signal for moving the fifth home appliance within the range of the threshold distance from the first space to the fifth home appliance based on the space information of the first space and the location information of the fifth home appliance, control the communication interface 120 to transmit a control signal for photographing the first space to the fifth home appliance, and when a photographed image is received from the fifth home appliance, control the communication interface 120 to transmit the received photographed image to a user terminal.

Detailed explanation in this regard will be described below in FIG. 17 and FIG. 20.

The electronic apparatus 100 according to an embodiment of the disclosure may partially change control information included in a user command based on the space information. Accordingly, even if the user does not separately transmit control commands to all spaces, the home appliances included in the plurality of spaces can be automatically controlled based on the information stored in the electronic apparatus 100. Accordingly, the user's convenience can be increased.

Also, as the plurality of home appliances respectively located in the plurality of spaces can be integrally controlled like an IoT network, the user's convenience can be increased.

In addition, in case power efficiency is low or a target value cannot be reached within a threshold time, energy can be saved through the feature of using an auxiliary home appliance.

Further, in case a problem occurs, an auxiliary home appliance can directly move, and then provide image data to the user, and thus the user can resolve the problem easily.

In the above, only simple components constituting the electronic apparatus 100 were illustrated and described, but in actual implementation, various components may additionally be included.

Figure 3:
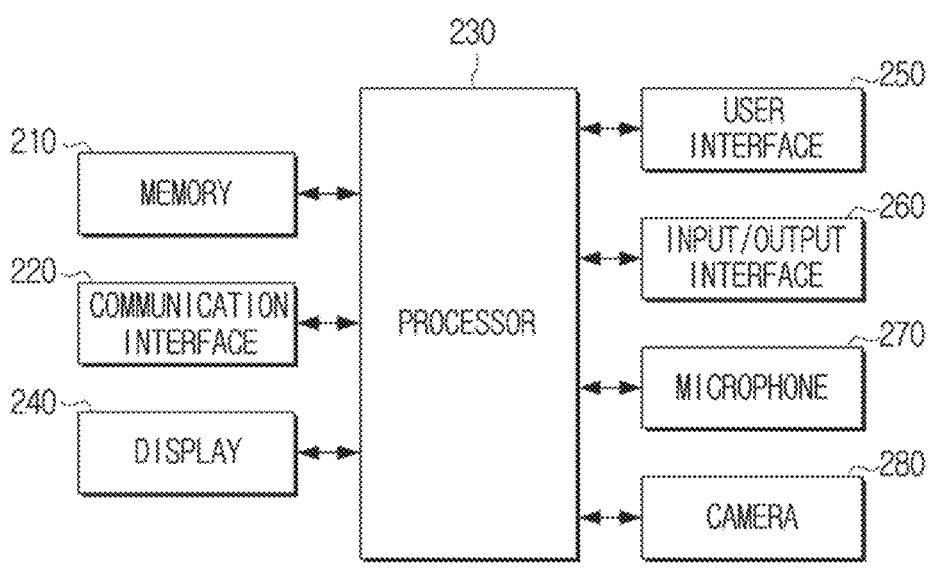
FIG. 3 is a block diagram illustrating a user terminal according to an embodiment of the disclosure.

FIG. 3 is a block diagram illustrating a user terminal according to an embodiment of the disclosure.

Referring to FIG. 3, a user terminal 200 may include a memory 210, a communication interface 220, a processor 230, a display 240, a user interface 250, an input/output interface 260, a microphone 270, and a camera 280.

As the memory 210, the communication interface 220, and the processor 230 in FIG. 3 may correspond to the memory 110, the communication interface 120, and the processor 130 in FIG. 2, overlapping explanation will be omitted.

The display 240 may be implemented in various forms such as a liquid crystal display (LCD), an organic light emitting diodes (OLED) display, a plasma display panel (PDP), etc. Inside the display 240, a driving circuit that may be an a-si TFT, a low temperature poly silicon (LTPS) TFT, an organic TFT (OTFT), etc., a backlight unit, etc. may also be included together. The display 240 may be a touch screen combined with a touch sensor, a flexible display, a 3D display, etc.

The user interface 250 may be a button, a touch pad, a mouse, and a keyboard, or as a touch screen that can perform both of the aforementioned display function and a manipulation input function. Here, a button may be various types of buttons such as a mechanical button, a touch pad, a wheel, etc. formed in any areas such as the front surface part, the side surface part, the rear surface part, etc. of the exterior of the main body of the electronic apparatus 100.

The input/output interface 260 may be any one interface among a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), or a digital visual interface (DVI).

The input/output interface 260 may input and output at least one of an audio signal or a video signal.

Depending on implementation examples, the input/output interface 260 may include a port inputting and outputting only audio signals and a port inputting and outputting only video signals as separate ports, or it may be implemented as one port that inputs and outputs both audio signals and video signals.

The microphone 270 may receive a user's voice in an activated state. For example, the microphone 270 may be formed as an integrated type in the upper side or the front surface direction, the side surface direction, etc. of the electronic apparatus 100. The microphone 270 may include various components such as a microphone collecting a user voice in an analog form, an amp circuit that amplifies the collected user voice, an A/D conversion circuit that samples the amplified user voice and converts the voice into a digital signal, a filter circuit that removes noise components from the converted digital signal, etc.

The camera 280 is a component for photographing a subject and generating a photographed image, and here, the photographed image is a concept including both of a moving image and a still image. The camera 280 may obtain an image for at least one external apparatus, and it may be implemented as a camera, a lens, an infrared sensor, etc.

The camera 280 may include a lens and an image sensor. As types of the lens, there are a general generic-purpose lens, a wide-angle lens, a zoom lens, etc., and the type may be determined according to the type, the characteristic, the use environment, etc. of the electronic apparatus 100. As the image sensor, a complementary metal oxide semiconductor (CMOS) and a charge coupled device (CCD), etc. may be used.

The camera 280 outputs an incident light as an image signal. Specifically, the camera 280 may include a lens, pixels, and an AD converter. The lens may collect lights of a subject and make an optical image formed on a photographing area, and the pixels may output the lights introduced through the lens as an image signal in an analog form. Then, the AD converter may convert the image signal in an analog form into an image signal in a digital form and output the signal. In particular, the camera 280 may be arranged to photograph the front surface direction of the electronic apparatus 100, and photograph a user that exists on the front surface of the electronic apparatus 100 and generate a photographed image.

Figure 4:
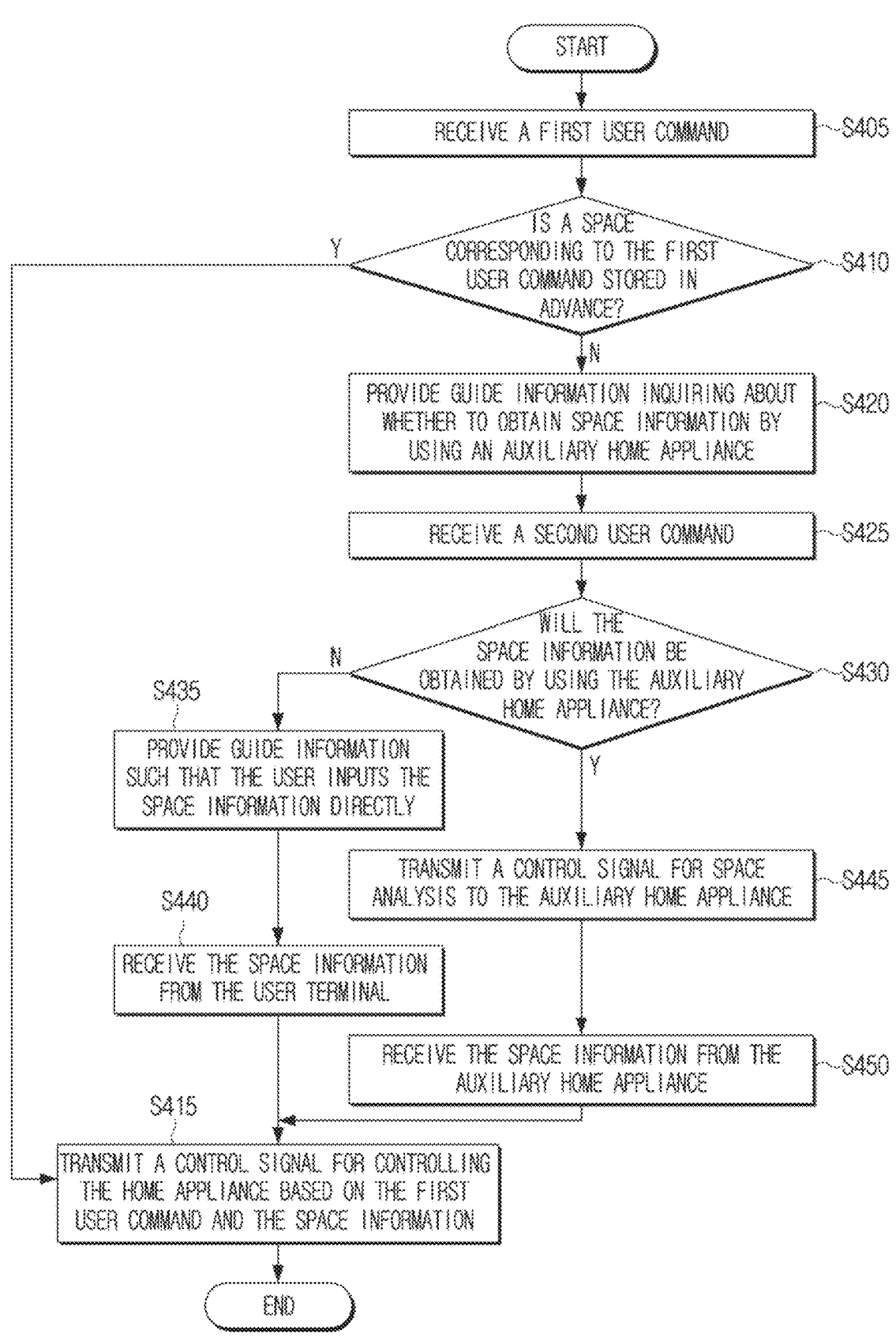
FIG. 4 is a flowchart for illustrating an operation of obtaining space information.

FIG. 4 is a flowchart for illustrating an operation of obtaining space information.

Referring to FIG. 4, the electronic apparatus 100 may receive a first user command in operation S405. Here, the first user command may mean a command for controlling at least one of the plurality of home appliances 401, 601-1 to 605-2. According to an embodiment, the first user command may be received at the user terminal 200, and the received first user command may be transmitted to the electronic apparatus 100. According to another embodiment, the first user command may be received by the plurality of home appliances 401, 601-1 to 605-2 themselves, and the received first user command may be transmitted to the electronic apparatus 100.

Here, the first user command may include control information. The control information may include identification information of the subject appliance, driving mode information, and environment data corresponding to the driving mode. The subject appliance identification information (the subject home appliance information) may mean identification information of the appliance that is to be controlled by the user. For example, the subject appliance identification may mean identification information of the first home appliance located in the first space. The driving mode information may mean one function among a plurality of functions that the subject appliance can perform. For example, the driving mode information may be a cooling mode. The environment data corresponding to the driving mode may mean a target value according to the driving mode. For example, it may be a target temperature 23 degrees in the cooling mode. The environment data may mean at least one of a target temperature, target humidity, or target fine dust.

The electronic apparatus 100 may identify a space corresponding to the first user command, and identify whether the identified space is stored in advance in the memory 110 of the electronic apparatus 100 in operation S410. Here, the space corresponding to the first user command may mean the space in which the subject appliance included in the first user command is located. For example, the space may mean the first space in which the first home appliance which is the subject appliance of the first user command is located.

In the first user command, subject appliance identification information may be included. The electronic apparatus 100 may have stored information related to the IoT network 400 in advance by the user. The electronic apparatus 100 may have mapped the identification information of the plurality of home appliances 401, 601-1 to 605-2 included in the IoT network 400 and the space information in which the plurality of home appliances 401, 601-1 to 605-2 are located, and stored the information.

In the operation S410, if the identified space is stored in advance in the memory 110 of the electronic apparatus 100, the electronic apparatus 100 may generate a control signal for controlling the subject home appliance based on the first user command and the space information, and transmit the generated control signal to the subject home appliance in operation S415.

In the operation S410, if the identified space is not stored in advance in the memory 110 of the electronic apparatus 100, the electronic apparatus 100 may provide guide information inquiring about whether to obtain space information by using the auxiliary home appliance 401 to the user in operation S420. Here, the guide information may mean information inquiring the user about whether to make the auxiliary home appliance 401 directly move and analyze a space corresponding to the IoT network 400. Here, the electronic apparatus 100 may generate guide information, and transmit the generated guide information to the user terminal 200. Then, the user terminal 200 may display the received guide information through the display 240 included in the user terminal 200.

Then, the electronic apparatus 100 may receive a second user command based on the guide information. Here, the second user command may mean a user command that determined whether the auxiliary home appliance 401 will analyze the space directly. Specifically, the user terminal 200 may receive the second user command, and transmit the received second user command to the electronic apparatus 100.

The electronic apparatus 100 may identify whether to obtain the space information by using the auxiliary home appliance 401 based on the received second user command in operation S430. If it is identified that the electronic apparatus 100 will not obtain the space information by using the auxiliary home appliance 401 based on the second user command, the electronic apparatus 100 may provide guide information such that the user inputs the space information directly in operation S435. The user may directly input the space information through an IoT network management application (referred to as the management application hereinafter). Accordingly, the electronic apparatus 100 may generate guide information for guiding input directly and transmit the information to the user terminal 200, and the user terminal 200 may display the received guide information on the display 240. Depending on implementation examples, the user terminal 200 may automatically execute the management application based on the guide information, and display a space information input screen. When the user directly inputs the space information through the management application, the user terminal 200 may transmit the input space information to the electronic apparatus 100. The electronic apparatus 100 may receive the space information from the user terminal 200 in operation S440. Then, the electronic apparatus 100 may generate a control signal for controlling the home appliance based on the first user command and the space information, and transmit the generated control signal to the subject home appliance in operation S415.

If it is identified that the electronic apparatus 100 will obtain the space information by using the auxiliary home appliance 401 based on the second user command, the electronic apparatus 100 may generate a control signal for space analysis, and transmit the generated control signal to the auxiliary home appliance 401 in operation S445. Then, the auxiliary home appliance 401 that received the control signal may directly perform space analysis. Specifically, the auxiliary home appliance 401 may be a movable apparatus, and the auxiliary home appliance 401 may directly move to a space corresponding to the IoT network, and analyze the space. The auxiliary home appliance 401 may obtain the space information based on the space analyzing operation. The space information may include at least one of the structure of the space or the number of the divided spaces. Then, the auxiliary home appliance 401 may transmit the space information to the electronic apparatus 100. The electronic apparatus 100 may receive the space information from the auxiliary home appliance 401 in operation S450. Then, the electronic apparatus 100 may generate a control signal for controlling the subject home appliance based on the first user command and the space information, and transmit the generated control signal to the subject home appliance in operation S415. In the aforementioned explanation, it was described that the auxiliary home appliance 401 directly obtains the space information. However, depending on implementation examples, in embodiments of the disclosure, the auxiliary home appliance 401 may obtain sensing data and transmit the data to the electronic apparatus 100, and the electronic apparatus 100 may analyze the received sensing data and obtain space information.

Figure 5:
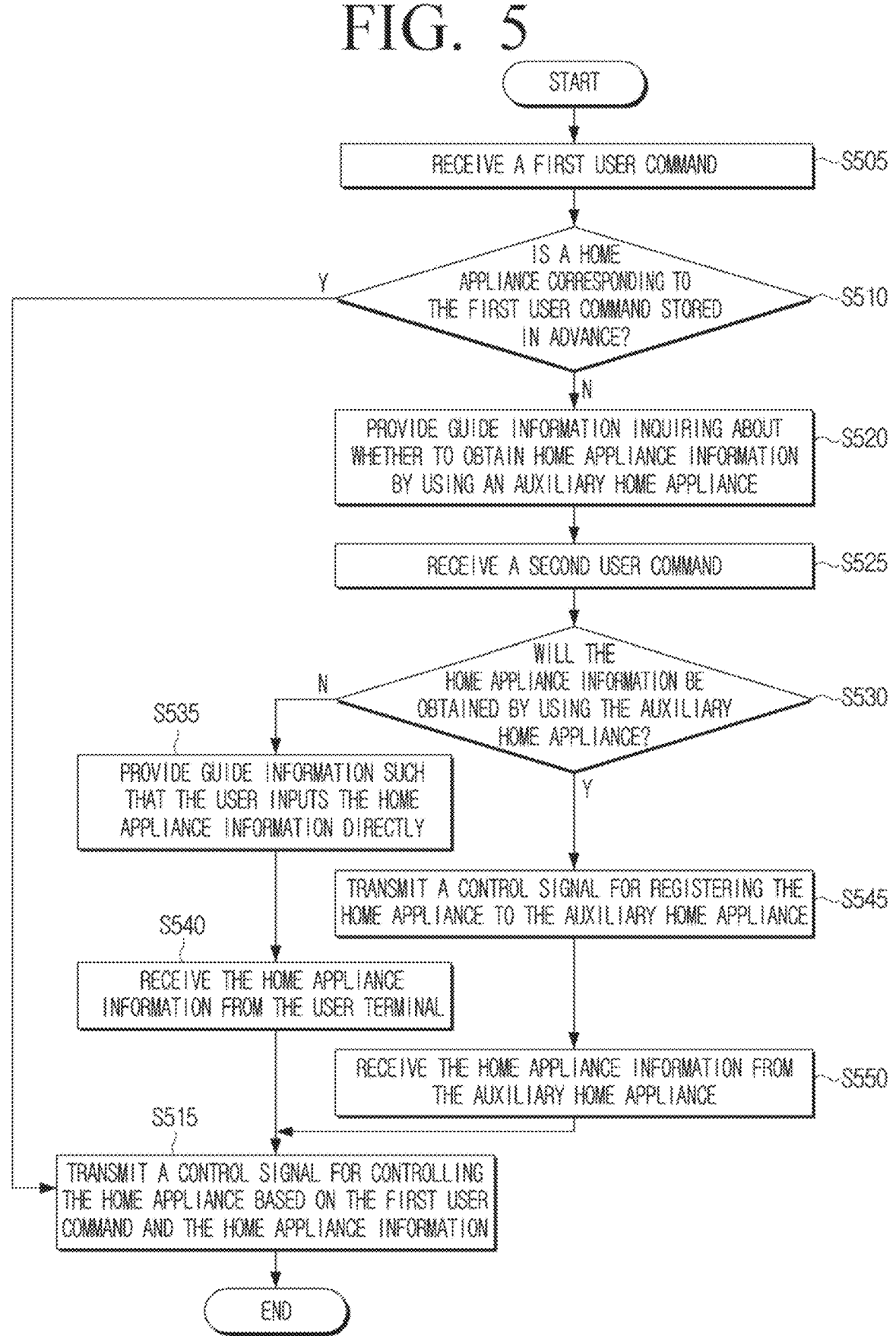
FIG. 5 is a flowchart for illustrating an operation of obtaining home appliance information.

FIG. 5 is a flowchart for illustrating an operation of obtaining home appliance information.

Referring to FIG. 5, the electronic apparatus 100 may receive a first user command in operation S505. Then, the electronic apparatus 100 may identify whether a home appliance corresponding to the first user command is stored in the memory 110 in operation S510. Specifically, in the memory 110, identification information of pre-registered home appliances and location information of the pre-registered home appliances may be stored. Accordingly, the electronic apparatus 100 may determine whether the appliance included in the first user command is pre-registered in the memory 110.

If the home appliance corresponding to the first user command is stored in the memory 110, the electronic apparatus 100 may generate a control signal for controlling the subject home appliance based on the first user command and the home appliance information (the home appliance identification information), and transmit the generated control signal to the subject home appliance in operation S515.

If the home appliance corresponding to the first user command is not stored in the memory 110, the electronic apparatus 100 may provide guide information inquiring about whether to obtain the home appliance information by using the auxiliary home appliance 401 in operation S520. Here, the guide information may mean the identification information of the home appliance and the location information of the home appliance. The location information may include information indicating in which space the home appliance is located among the plurality of spaces included in the IoT network, and information indicating in which location in the specific space the home appliance is installed (installed location information). Here, the guide information may mean information guiding to register an unregistered home appliance. Specifically, the electronic apparatus 100 may generate guide information inquiring about whether to register an unregistered home appliance, and transmit the information to the user terminal 200, and the user terminal 200 may display the received guide information on the display 240. Then, when the second user command is received based on the displayed guide information, the user terminal 200 may transmit the second user command to the electronic apparatus 100. The electronic apparatus 100 may receive the second user command from the user terminal 200 in operation S525.

The electronic apparatus 100 may identify whether to obtain the home appliance information by using the auxiliary home appliance 401 based on the received second user command in operation S530. If it is identified that the electronic apparatus 100 will not obtain the home appliance information by using the auxiliary home appliance 401, the electronic apparatus 100 may provide guide information such that the user inputs the home appliance information directly in operation S535. Specifically, the user may directly register the home appliance through the IoT network management application (referred to as the management application hereinafter). Accordingly, the electronic apparatus 100 may generate guide information for guiding the user to directly input the home appliance information through the management application, and transmit the generated guide information to the user terminal 200. Then, when the home appliance information is received through the management application installed on the user terminal 200 by the user, the input home appliance information may be transmitted to the electronic apparatus 100. Then, the electronic apparatus 100 may receive the home appliance information from the user terminal 200 in operation S540. Then, the electronic apparatus 100 may generate a control signal for controlling the home appliance based on the first user command and the home appliance information, and transmit the generated control signal to the subject home appliance in operation S515.

If it is identified that the electronic apparatus 100 will obtain the home appliance information by using the auxiliary home appliance 401, the electronic apparatus 100 may generate a control signal for registering a home appliance, and transmit the generated control signal to the auxiliary home appliance 401 in operation S545. Specifically, the auxiliary home appliance 401 may identify the location of an unregistered home appliance based on the identification information of the unregistered home appliance. For example, the auxiliary home appliance 401 may move to a space corresponding to the IoT network based on the identification information of an unregistered air conditioner, and identify the location of the unregistered air conditioner. Then, the auxiliary home appliance 401 may map the identified location and the identification information of the air conditioner. Here, the identified location may be specified based on the space information. Accordingly, when the auxiliary home appliance 401 receives a control signal for registering a home appliance from the electronic apparatus 100, the auxiliary home appliance 401 may obtain home appliance information corresponding to the subject home appliance. Then, the auxiliary home appliance 401 may transmit the obtained home appliance information to the electronic apparatus 100. Here, the electronic apparatus 100 may receive the home appliance information from the auxiliary home appliance 401 in operation S550. Then, the electronic apparatus 100 may generate a control signal for controlling the home appliance based on the first user command and the home appliance information, and transmit the generated control signal to the subject home appliance in operation S515.

In FIG. 4 and FIG. 5, it was described that a user command is received through the user terminal 200, and guide information is provided to the user through the user terminal 200. However, depending on implementation examples, the operation of receiving a user command and the operation of providing guide information may be performed in a home appliance itself, rather than in the user terminal 200.

Figure 6:
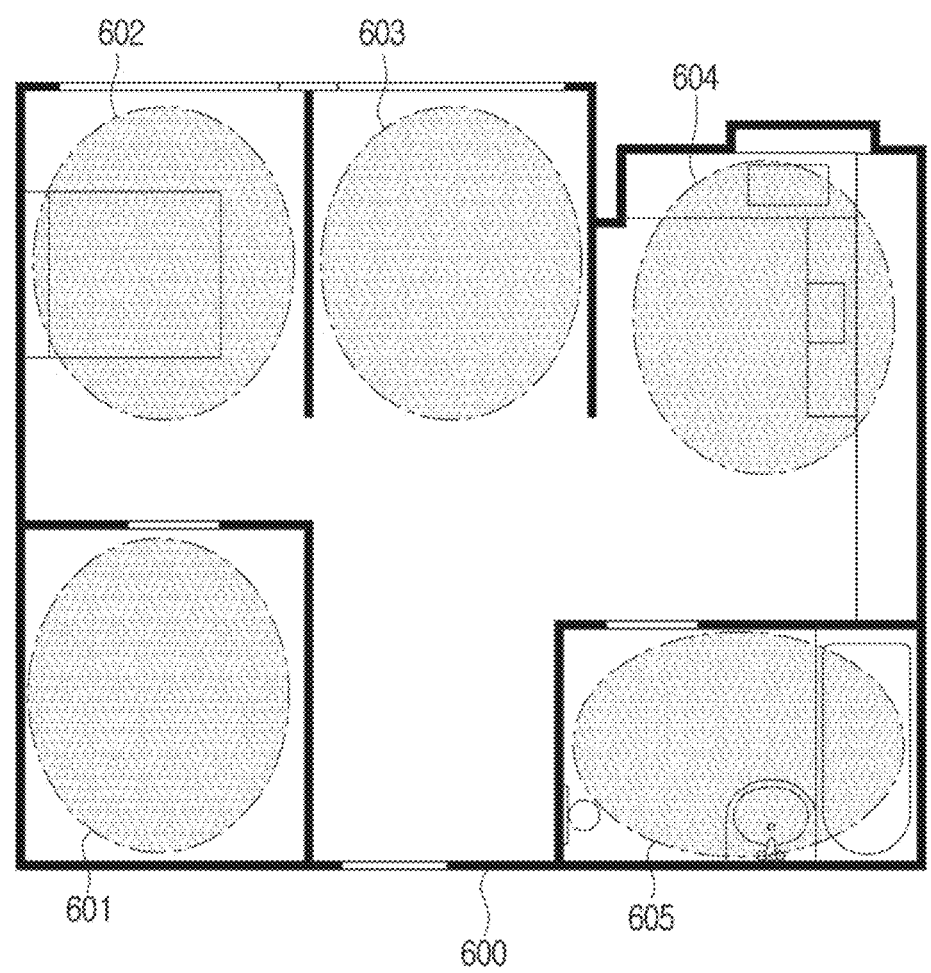
FIG. 6 is a diagram for illustrating spaces wherein a plurality of home appliances included in an IoT network are located.

FIG. 6 is a diagram for illustrating spaces in which a plurality of home appliances included in an IoT network are located.

Referring to FIG. 6, a space 600 corresponding to the IoT network 400 may be divided into a plurality of spaces 601 to 605. Here, the space 600 corresponding to the IoT network 400 may be the entire spaces in which the plurality of home appliances 401, 601-1 to 605-2 included in the IoT network 400 are located. For example, the space 600 corresponding to the IoT network 400 may be a house in which the plurality of home appliances 401, 601-1 to 605-2 are installed. The space 600 may be divided into a first space 601, a second space 602, a third space 603, a fourth space 604, and a fifth space 605.

Here, the space 600 may be divided into the plurality of spaces 601 to 605 according to a predetermined standard. According to an embodiment, the predetermined standard may be structures. For example, each space blocked by a wall may be divided into a separate space. According to another embodiment, the predetermined standard may be functions. For example, each space may be divided per function, and the spaces may be divided to suit their functions. According to still another embodiment, the predetermined standard may be the density of home appliances. For example, if a home appliance is located within a threshold distance, the space in which the home appliance is located may be identified as one space.

The space 600 disclosed in FIG. 6 was assumed to be divided into the plurality of spaces 601 to 605 based on the structures.

Figure 7:
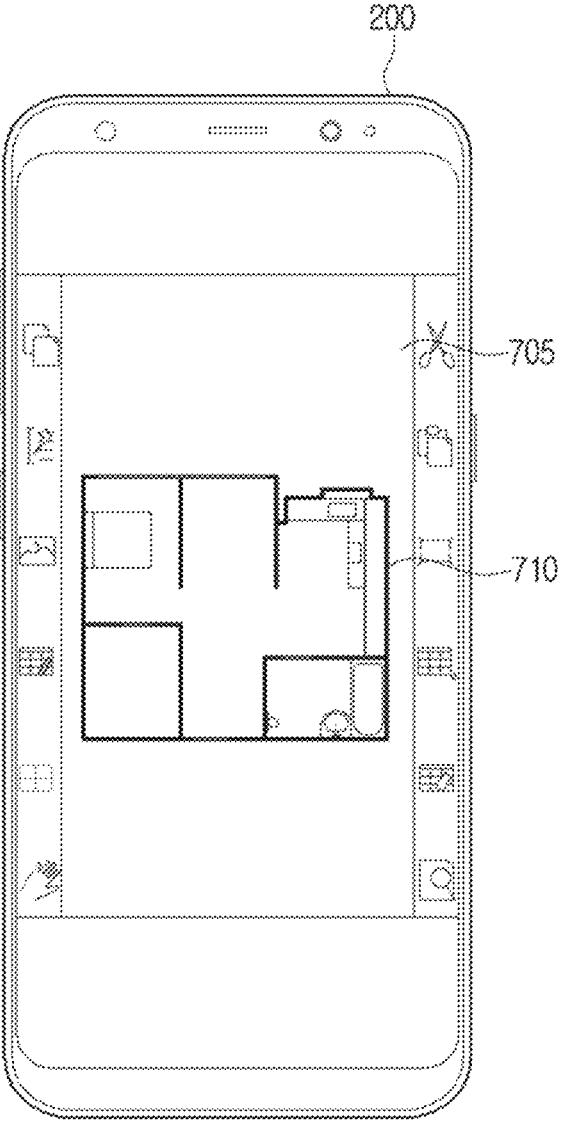
FIG. 7 is a diagram for illustrating an operation of obtaining space information through a management application.

FIG. 7 is a diagram for illustrating an operation of obtaining space information through a management application.

Referring to FIG. 7, in the user terminal 200, an IoT network management application may be installed. Then, the user terminal 200 may execute the management application based on guide information received from the electronic apparatus 100. Then, the user terminal 200 may display a screen 705 related to the management application on the display 240. Through the screen 705, the user terminal 200 may obtain space information or home appliance information. Then, the user terminal 200 may transmit the obtained space information or home appliance information to the electronic apparatus 100.

Figure 8:
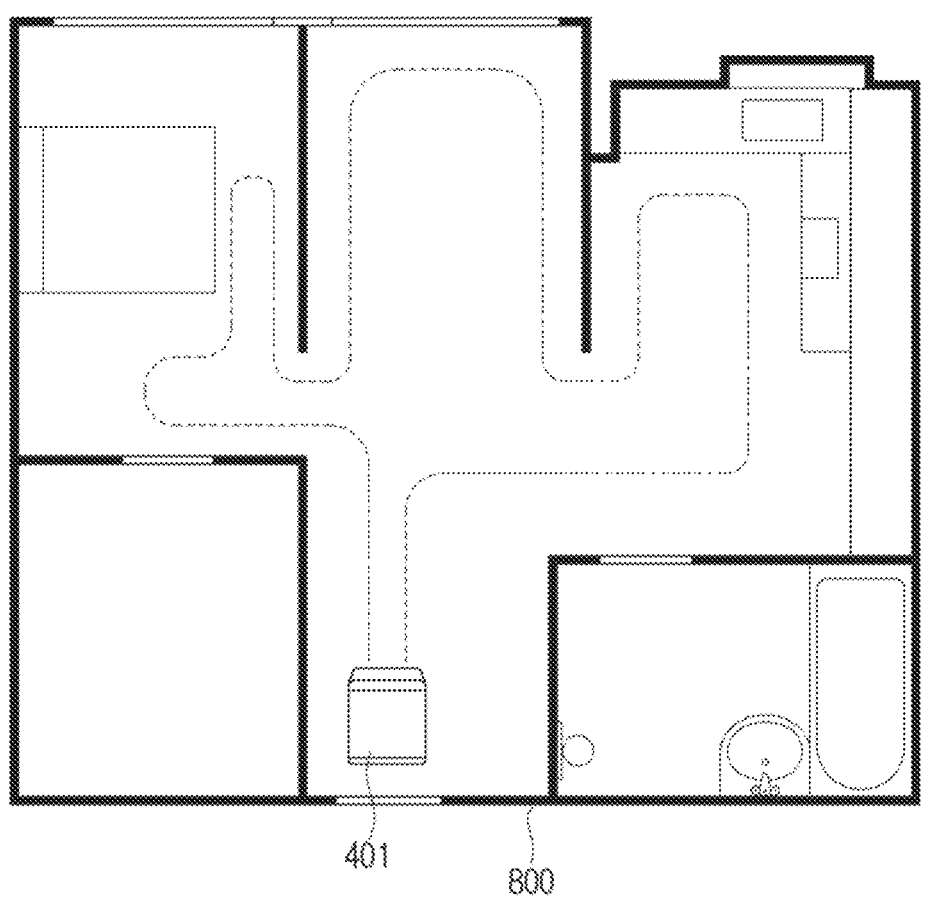
FIG. 8 is a diagram for illustrating an operation of an auxiliary home appliance of obtaining space information by moving directly.

FIG. 8 is a diagram for illustrating an operation of an auxiliary home appliance of obtaining space information by moving directly.

Referring to FIG. 8, the auxiliary home appliance 401 may be a movable apparatus, and may include a camera or a three-dimensional (3D) sensor. Also, the auxiliary home appliance 401 may move to a space 800 corresponding to the IoT network, and perform space analysis. Here, the auxiliary home appliance 401 may obtain the space information of the space 800 by performing the space analyzing operation. Specifically, the space information may include the structure information and the information on the number of the divided spaces. The auxiliary home appliance 401 may obtain the structure information along the wall surface of the space 800, and divide the space 800 into a plurality of numbers according to a predetermined standard.

Figure 9:
FIG. 9 is a diagram for illustrating spaces wherein a plurality of home appliances and an auxiliary home appliance are located.

FIG. 9 is a diagram for illustrating spaces in which a plurality of home appliances and an auxiliary home appliance are located.

Referring to FIG. 9, the auxiliary home appliance 401 may be a movable apparatus, and it may include a communication module that can identify the plurality of home appliances 601-1, 601-2, 602-1, 602-2, 603-1, 603-2, 604-1, 604-2, 605-1, 605-2. Specifically, the auxiliary home appliance 401 may include a wireless communication module, and may identify the plurality of home appliances according to a predetermined method. For example, if the auxiliary home appliance 401 transmits a request packet through a Wi-Fi signal or a Bluetooth signal, the auxiliary home appliance 401 may receive a response packet from each of the plurality of home appliances. Then, the auxiliary home appliance 401 may obtain the location information of each of the plurality of home appliances based on the received response packet. The auxiliary home appliance 401 may map the obtained identification information of the home appliances and location information of the home appliances and obtain home appliance information, and transmit the obtained home appliance information to the electronic apparatus 100.

FIG. 10 is a diagram for illustrating information corresponding to a plurality of respective spaces.

Referring to FIG. 10, the electronic apparatus 100 may store a table of target environment data of each space 1005 and a table of home appliance information of each space 1010.

The table of target environment data of each space 1005 indicates target environment data according to an embodiment, and it may include at least one of identification information, uses, or environment data. A different set value may be set for each space. Here, the target environment data of each space may mean target set values set differently according to spaces. Here, the environment data may include at least one of a temperature, humidity, or fine dust concentration. A user may set target environment data differently for each space. For example, a user may set a room such that the temperature becomes 27 degrees, the humidity becomes 60%, and the fine dust concentration becomes 5 ug/m^3, and at the same time, set the kitchen such that the temperature becomes 24 degrees, the humidity becomes 70%, and the fine dust concentration becomes 60 ug/m^3. Here, each target set value does not need to be input by the user one by one, and the value may be set automatically based on space information.

The electronic apparatus 100 may obtain the target environment data based on weather information and space information. The electronic apparatus 100 may obtain weather information from an external server. Also, the electronic apparatus 100 may obtain space information as obtained in FIG. 4. Here, the space information may include use information of a space. The electronic apparatus 100 may obtain optimal target environment data based on the weather information and the use information. For example, the electronic apparatus 100 may obtain weather information which is the outdoor temperature of 30 degrees, the humidity of 80%, and the fine dust concentration of 30 ug/m^3. Then, the electronic apparatus 100 may identify whether the use of each room is a space for a kid, a space corresponding to the kitchen, etc. Then, the electronic apparatus 100 may determine such that the temperature becomes high for the kid's room, and the temperature is set to be low for the kitchen. As the kid can catch a cold because of a cold temperature, the electronic apparatus 100 may set the temperature higher than other spaces. As the concentration of fine dust generated in a cooking process of food may increase in the kitchen, the electronic apparatus 100 may set the set value of the fine dust concentration to be higher than other spaces for power efficiency.

The table 1010 indicates home appliance information for each space. According to a space, at least one home appliance having identical or different functions may be located. The table 1010 may have summed up home appliance information of each space corresponding to FIG. 9. The home appliance information may additionally include unique identification information of the home appliances.

Figure 11:
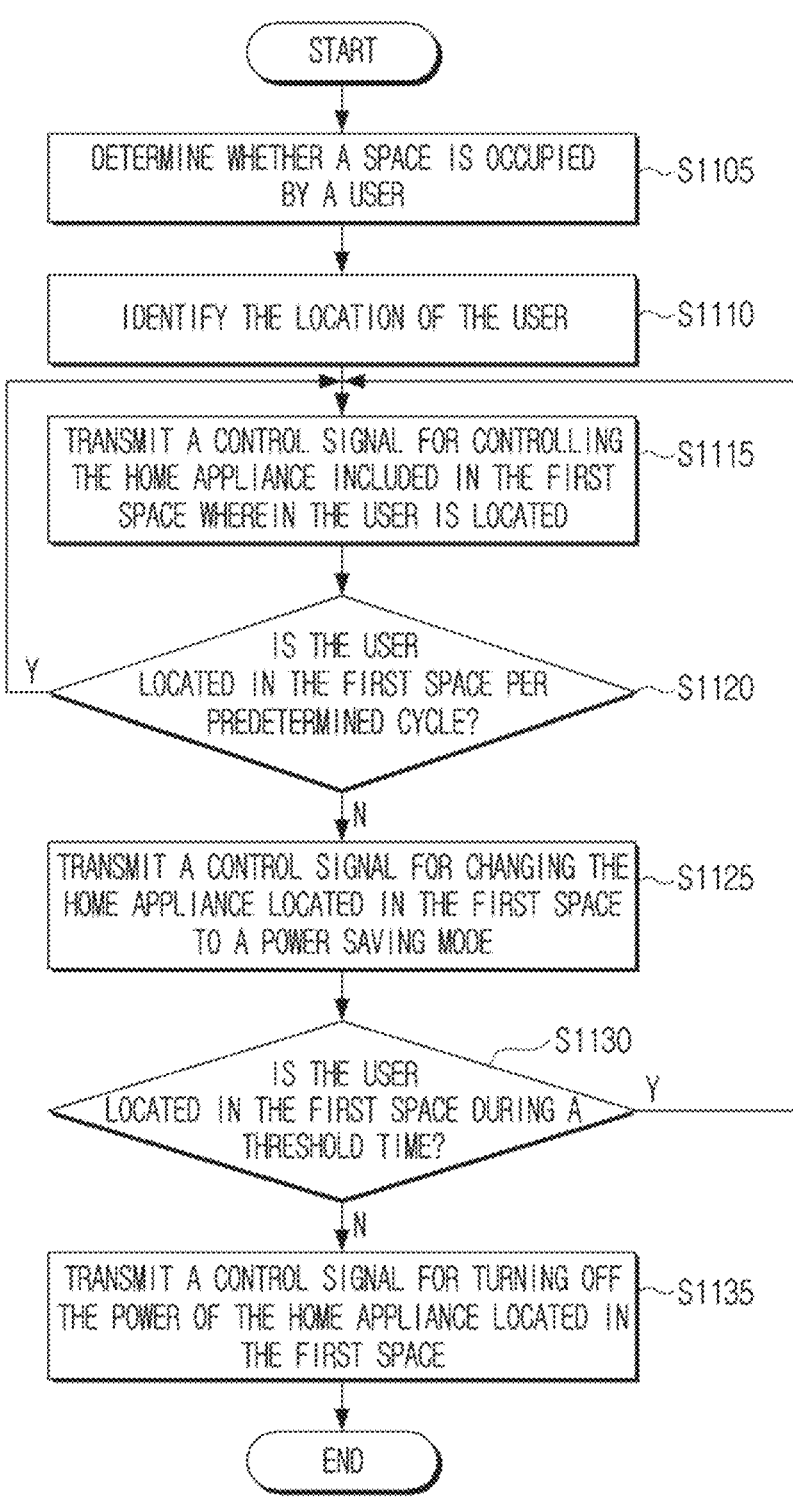
FIG. 11 is a flowchart for illustrating an operation of controlling a home appliance based on whether a space is occupied by a user.

FIG. 11 is a flowchart for illustrating an operation of controlling a home appliance based on whether a space is occupied by a user.

Referring to FIG. 11, the electronic apparatus 100 may determine whether a space corresponding to the IoT network 400 is occupied by a user in operation S1105. Specifically, the electronic apparatus 100 may use the plurality of home appliances included in the IoT network 400 for identifying whether a user exists in a space corresponding to the IoT network 400. A home appliance including a camera among the plurality of home appliances may determine whether the space is occupied by the user based on a photographed image. Depending on implementation examples, some home appliances may determine whether the space is occupied by the user by using sensing data obtained from an object recognition sensor other than a camera. Specifically, the electronic apparatus 100 may determine whether the space is occupied by the user by using the auxiliary home appliance 401.

Specifically, some home appliances may identify the user's location based on a photographed image or sensing data in operation S1110. Specifically, the electronic apparatus 100 may identify in which space the user is located among the plurality of spaces. Then, the electronic apparatus 100 may generate a control signal for controlling the home appliance included in the space in which the user is located (assumed as the first space), and transmit the generated control signal to the home appliance included in the space in which the user is located in operation S1115. For example, if the user is located in the first space, the electronic apparatus 100 may control at least one home appliance located in the first space. Here, the electronic apparatus 100 may generate a control signal for the at least one home appliance to operate in a specific driving mode and a set value corresponding to the specific driving mode, and transmit the generated control signal to the at least one home appliance.

The electronic apparatus 100 may determine whether a user is located in the first space per predetermined cycle in operation S1120. As the user may move, the electronic apparatus 100 may determine the location of the user per predetermined cycle. If the user is located in the first space (the space in which the user was already identified) without a change, the electronic apparatus 100 may repeatedly perform the operation S1115 and the operation S1120 per predetermined cycle.

However, if the user is not located in the first space (the space in which the user was already identified), the electronic apparatus 100 may generate a control signal for changing the home appliance located in the first space to a power saving mode, and transmit the generated control signal to the home appliance located in the first space in operation S1125. This is because, if the user is not located in the first space, there is no need to perform the operation S1115 anymore. However, in consideration of a situation wherein the user is temporarily out of the first space, the electronic apparatus 100 may perform control such that the home appliance located in the first space operates in the power saving mode, instead of turning off the power completely.

After changing the home appliance located in the first space to the power saving mode by the operation S1125, the electronic apparatus 100 may identify again whether the user is located in the first space during a threshold time in operation S1130. For example, the electronic apparatus 100 may identify whether the user is located in the first space during 10 minutes (the threshold time) right after the home appliance located in the first space was changed to the power saving mode. If the user is identified in the first space within the threshold time, the electronic apparatus 100 may perform the operations S1115 to S1130 again. If the user is not identified in the first space within the threshold time, the electronic apparatus 100 may generate a control signal for turning off the power of the home appliance located in the first space, and transmit the generated control signal to the home appliance located in the first space in operation S1135.

Figure 12:
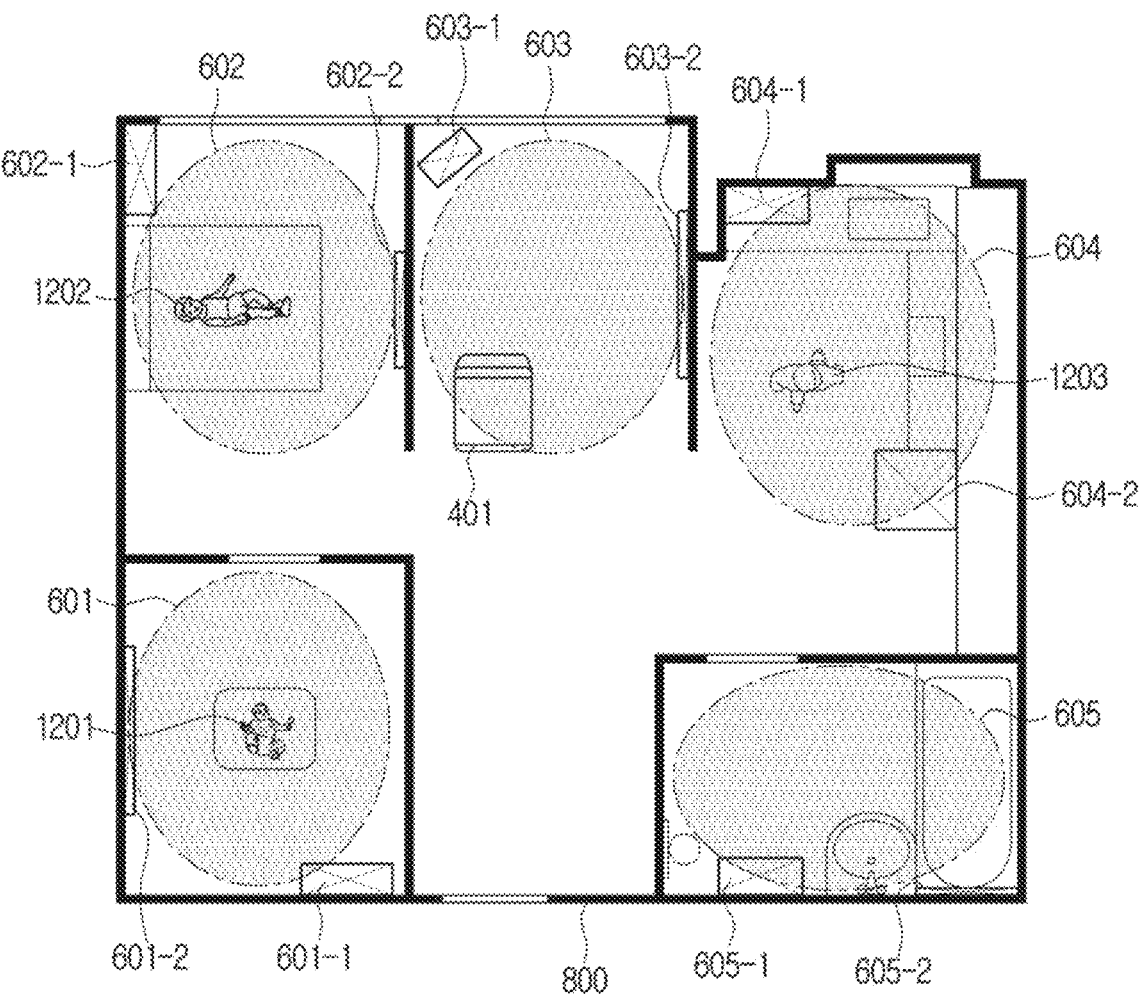
FIG. 12 is a diagram for illustrating an operation related to user occupancy in FIG. 11.

FIG. 12 is a diagram for illustrating an operation related to user occupancy in FIG. 11.

Referring to FIG. 12, the space 800 may be divided into a plurality of spaces, and the electronic apparatus 100 may identify in which space among the respective spaces the user exists by using the auxiliary home appliance 401. Here, the auxiliary home appliance 401 may be a movable apparatus, and it may identify the user through a camera or a sensor. If the auxiliary home appliance 401 performs the operation of determining whether a space is occupied by the user, the auxiliary home appliance 401 may obtain user occupancy information and home appliance information located in the space occupied by the user.

For example, the electronic apparatus 100 may obtain information that the first user 1201 is located in the first space 601, and two home appliances 601-1, 601-2 are located in the first space. Also, the electronic apparatus 100 may obtain information that the second user 1202 is located in the second space 602, and two home appliances 602-1, 602-2 are located in the second space. In addition, the electronic apparatus 100 may obtain information that the third user 1203 is located in the fourth space 604, and two home appliances 604-1, 604-2 are located in the fourth space.

Figure 13:
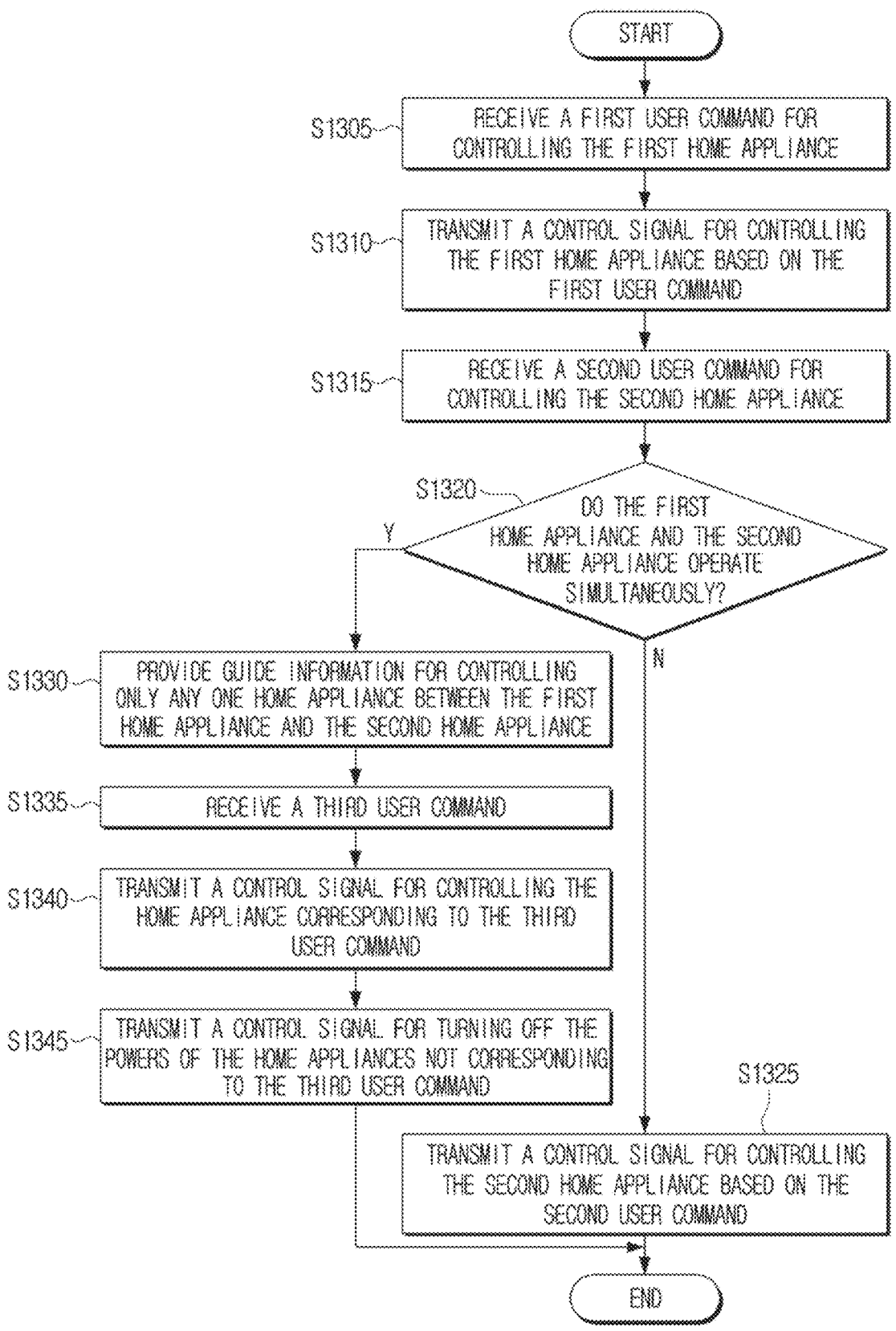
FIG. 13 is a diagram for illustrating an operation of controlling such that a ventilator and a temperature and humidity adjustment apparatus do not operate simultaneously based on driving state information of the ventilator and the temperature and humidity adjustment apparatus.

FIG. 13 is a diagram for illustrating an operation of controlling such that a ventilator and a temperature and humidity adjustment apparatus do not operate simultaneously based on driving state information of the ventilator and the temperature and humidity adjustment apparatus.

Referring to FIG. 13, the electronic apparatus 100 may receive a first user command for controlling the first home appliance in operation S1305. Then, the electronic apparatus 100 may generate a control signal for controlling the first home appliance based on the first user command, and transmit the generated control signal to the first home appliance in operation S1310. Then, the electronic apparatus 100 may receive a second user command for controlling the second home appliance in operation S1315.

Here, it is assumed that the first home appliance and the second home appliance are home appliances that cannot be used simultaneously. For example, in case the first home appliance is an air conditioner, and the second home appliance is a ventilator, if the air conditioner and the ventilator are turned on simultaneously, power efficiency may be reduced. Accordingly, the electronic apparatus 100 may store information on home appliances that should not operate simultaneously in the memory 110. For example, an air conditioner and a ventilator, and an air purifier and a ventilator may be home appliances that cannot operate simultaneously with each other.

The electronic apparatus 100 may identify whether the first home appliance and the second home appliance operate simultaneously in operation S1320. Specifically, if it is identified that the first home appliance included in the first user command and the second home appliance additionally received fall under home appliances that cannot operate simultaneously, the electronic apparatus 100 may identify whether the first home appliance and the second home appliance operate simultaneously. After a specific time passed after the first user command for controlling the first home appliance was received, the second user command for controlling the second home appliance is received, and thus the electronic apparatus 100 may identify whether there is a possibility that power efficiency may be reduced as the first home appliance and the second home appliance operate simultaneously, practically through the operation S1320.

In some cases, a situation wherein the first home appliance does not operate at the time point when the second user command was received after a specific time passed may occur. Here, if it is identified that the first home appliance and the second home appliance do not operate simultaneously, the electronic apparatus 100 may generate a control signal for controlling the second home appliance based on the second user command, and transmit the generated control signal to the second home appliance in operation S1325.

If it is identified that the first home appliance and the second home appliance operate simultaneously, the electronic apparatus 100 may provide guide information for controlling only any one home appliance between the first home appliance and the second home appliance to the user in operation S1330. Here, the guide information may mean information guiding the user to select one of the first home appliance or the second home appliance. Specifically, the electronic apparatus 100 may generate guide information, and transmit the generated guide information to the user terminal 200. Then, the user terminal 200 that received the guide information may display the information on the display 240. The user may input a third user command through the user terminal 200. Then, the user terminal 200 may transmit the received third user command to the electronic apparatus 100.

The electronic apparatus 100 may receive the third user command from the user terminal 200 in operation S1335. Then, the electronic apparatus 100 may generate a control signal for controlling the home appliance corresponding to the third user command, and transmit the generated control signal to the home appliance corresponding to the third user command in operation S1340. Here, the home appliance corresponding to the third user command may mean one of the first home appliance or the second home appliance, and may mean the home appliance selected by the third user command.

Then, the electronic apparatus 100 may generate a control signal for turning off the powers of the home appliances not corresponding to the third user command, and transmit the generated control signal to the home appliances not corresponding to the third user command in operation S1345.

For example, if the third user command includes information for controlling the first home appliance, the electronic apparatus 100 may generate a control signal for controlling the first home appliance, and generate a control signal for turning off the power of the second home appliance. Then, the electronic apparatus 100 may transmit the generated control signal to the first home appliance.

FIG. 14 is a table for illustrating an operation of identifying whether integrated control is needed based on environment data for each space.

Referring to FIG. 14, the electronic apparatus 100 may control spaces corresponding to the IoT network 400 with the plurality of home appliances included in the IoT network 400. Specifically, the electronic apparatus 100 may obtain environment data corresponding to the spaces in which the plurality of home appliances are included through the IoT network 400. It is assumed that the environment data described in FIG. 14 is the temperature. The electronic apparatus 100 may obtain the set temperature and the current temperature, and compare the temperatures.

The electronic apparatus 100 may control the plurality of home appliances included in the IoT network 400 based on set values corresponding to the plurality of spaces. The electronic apparatus 100 may compare the set value of each of the plurality of spaces and the sensing value sensed in each of the plurality of spaces after a threshold time passed. Here, if the difference value between the set value and the sensing value is greater than or equal to a threshold value, the electronic apparatus 100 may identify that integrated control for the space is needed. Here, integrated control may mean an operation of controlling the IoT network 400 by additionally using the auxiliary home appliance 401 other than general home appliances.

For example, in the first space, the second space, the third space to the fifth space, the difference between the set value and the sensing value is smaller than or equal to the threshold value, and thus the electronic apparatus 100 may identify that the first space, the second space, the third space to the fifth space are spaces which do not need integrated control. In the fourth space, the difference between the set value and the sensing value is greater than or equal to the threshold value, and thus the electronic apparatus 100 may identify that integrated control is needed for the fourth space.

Figure 15:
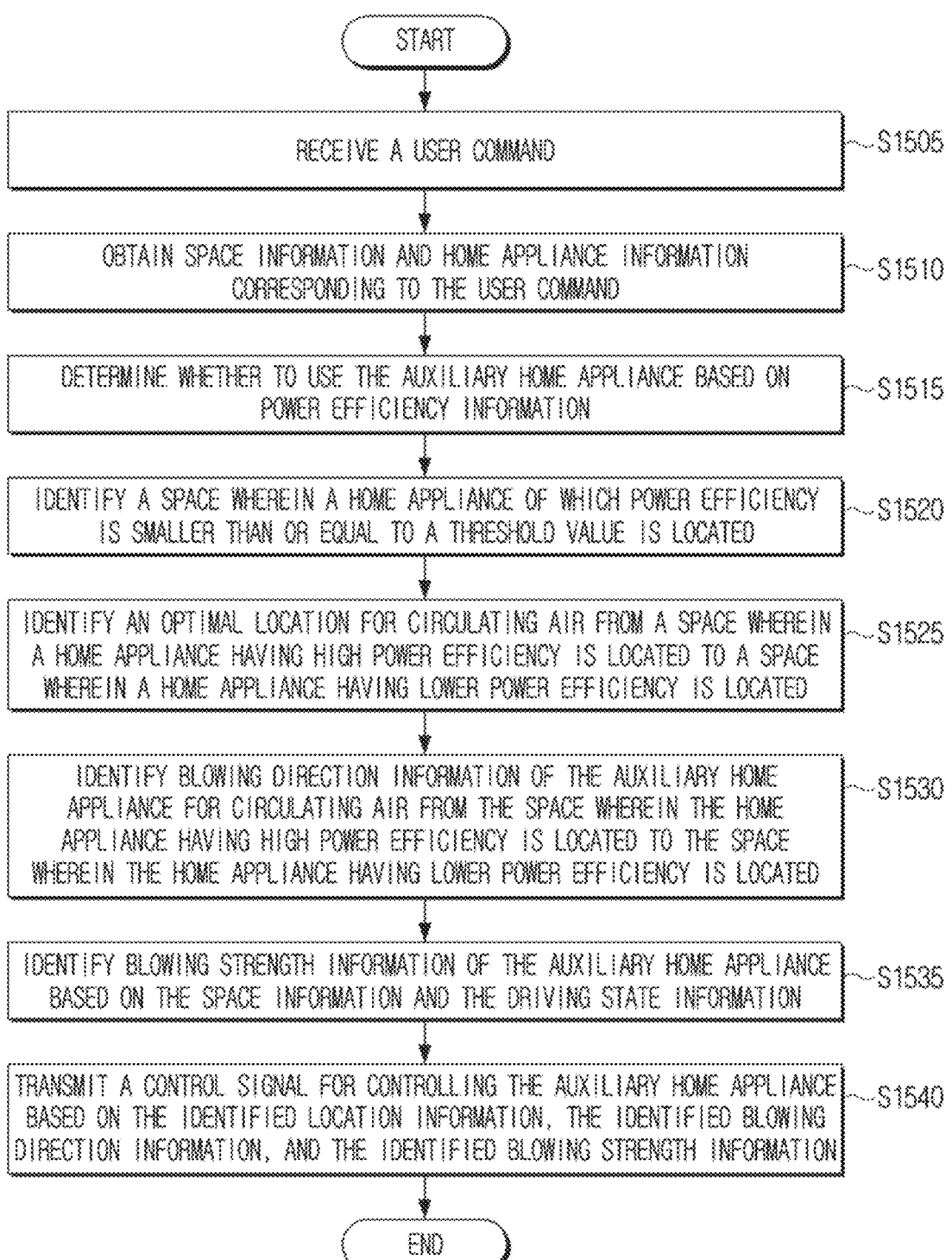
FIG. 15 is a diagram for illustrating an operation of identifying whether integrated control is needed based on power efficiency information.

FIG. 15 is a diagram for illustrating an operation of identifying whether integrated control is needed based on power efficiency information.

Referring to FIG. 15, the home appliance may be an air conditioner. For example, the home appliance may be an apparatus related to air such as an air conditioner, an air purifier, a fan, and a circulator.

The electronic apparatus 100 may receive a user command in operation S1505. Here, the user command may be a command for controlling at least two home appliances. Then, the electronic apparatus 100 may obtain space information and home appliance information corresponding to the user command in operation S1510. Here, the space information corresponding to the user command may mean information related to the subject space to be controlled by the user. The information related to the subject space may include at least one of the structure of the subject space, the use of the subject space, or a target set value of the subject space. The home appliance information may include at least one of identification information of the home appliance, location information of the home appliance, or power efficiency information of the home appliance.

The electronic apparatus 100 may determine whether to use the auxiliary home appliance 401 based on power efficiency information in operation S1515. Specifically, if the power efficiency of a home appliance corresponding to a user command is lower than a threshold value, the electronic apparatus 100 may identify that the auxiliary home appliance 401 needs to be used. If the power efficiency is low, energy consumption may increase, and electricity may be consumed too much. Accordingly, the electronic apparatus 100 may perform control to help air circulation by using the auxiliary home appliance 401.

Specifically, the electronic apparatus 100 may identify a home appliance of which power efficiency is smaller than or equal to a threshold value, and identify the space in which the identified home appliance is located in operation S1520.

Then, the electronic apparatus 100 may identify an optimal location for circulating air from a space in which a home appliance having high power efficiency is located to a space in which a home appliance having low power efficiency is located in operation S1525. The optimal location may be a location wherein power consumption in a home is calculated to be the lowest when the auxiliary home appliance 401 performs an auxiliary operation of circulating air. An embodiment of moving to an optimal location will be described below in FIG. 19.

Then, the electronic apparatus 100 may identify blowing direction information of the auxiliary home appliance 401 for circulating air from the space in which the home appliance having high power efficiency is located to the space in which the home appliance having low power efficiency is located in operation S1530. For example, the blowing direction information may be information indicating by what angle among 360 degrees the air will be circulated. For example, in the embodiment of FIG. 19, the blowing direction information may be the direction of circulating air from the second space to the first space.

Then, the electronic apparatus 100 may identify blowing strength information of the auxiliary home appliance 401 based on the space information and the driving state information in operation S1535. Here, the driving state information may include at least one of the determined driving mode, target environment data (a target set value) corresponding to the driving mode, or current environment data (a sensed value) for performing a control operation corresponding to the user command. The electronic apparatus 100 may determine from which space to which space the air will be circulated based on the space information, and determine the blowing strength based on the target environment data and the current environment data included in the driving state information.

The blowing strength may be determined based on the space information. As the distance between the space in which the home appliance having high energy efficiency is located and the space in which the home appliance having low energy efficiency is located is farther, the blowing strength may become stronger.

The blowing strength may be determined based on the driving state information. As the difference between the target environment data (e.g., the target temperature) and the current environment data (e.g., the current temperature) is bigger, the blowing strength may become stronger.

Then, the electronic apparatus 100 may generate a control signal for controlling the auxiliary home appliance 401 based on the location information identified in the operation S1525, the blowing direction information identified in the operation S1530, and the blowing strength information identified in the operation S1535, and transmit the generated control signal to the auxiliary home appliance 401 in operation S1540.

Figure 16:
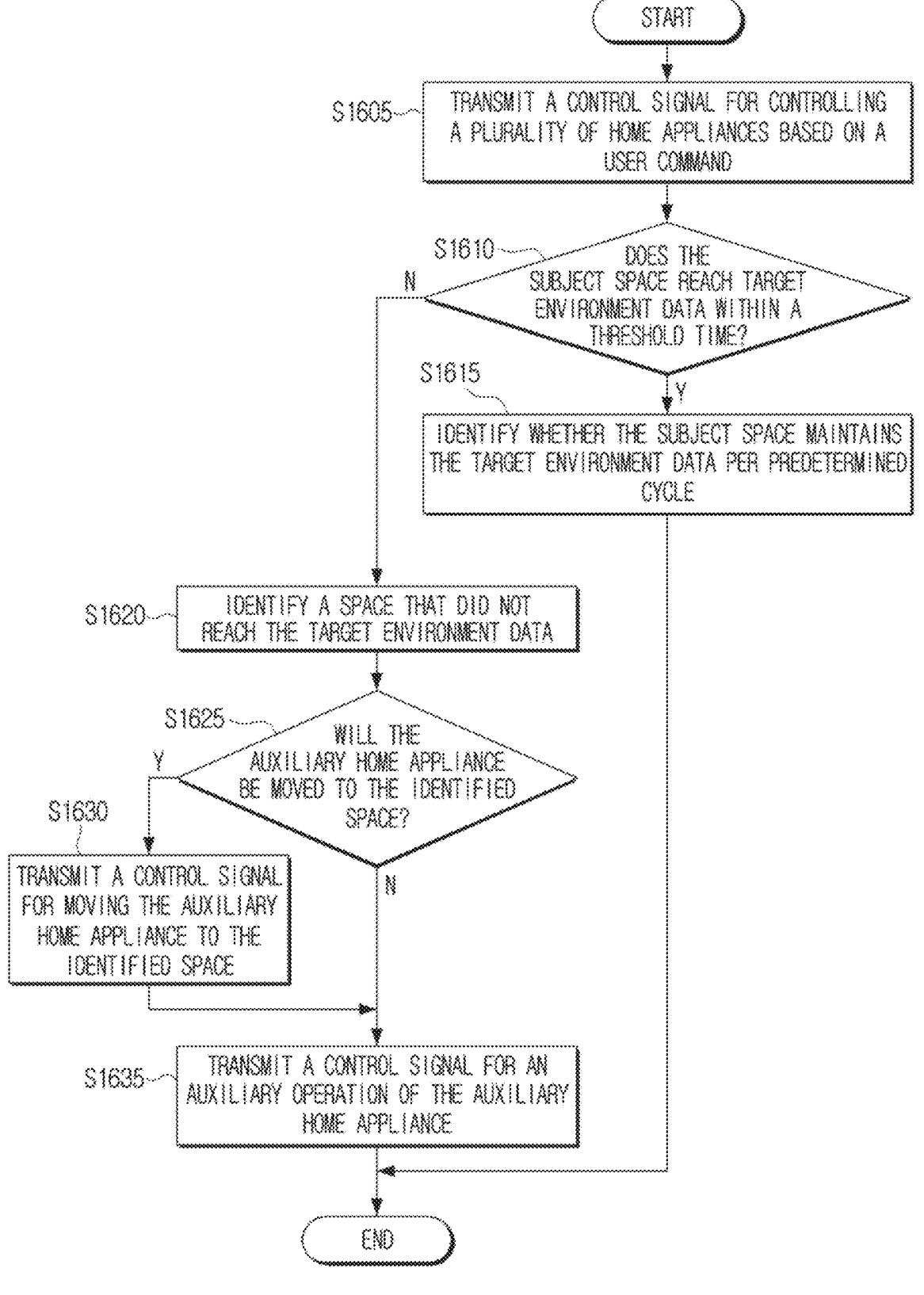
FIG. 16 is a diagram for illustrating an operation of controlling an auxiliary home appliance in case target data is not reached within a threshold time.

FIG. 16 is a diagram for illustrating an operation of controlling an auxiliary home appliance in case target data is not reached within a threshold time.

Referring to FIG. 16, the electronic apparatus 100 may generate a control signal for controlling a plurality of home appliances based on a user command, and transmit the generated control signal to a subject home appliance in operation S1605. Then, the electronic apparatus 100 may identify whether a subject space (a space to be controlled) reached target environment data within a threshold time in operation S1610. For example, it is assumed that the electronic apparatus 100 received a user command for setting the target temperature of 24 degrees by using the first home appliance (an air conditioner) located in the first space. The electronic apparatus 100 may determine whether the first space reached 24 degrees which is the target temperature within the threshold time (e.g., 15 minutes).

In case the subject space reached the target environment data within the threshold time, the electronic apparatus 100 may identify whether the subject space is maintaining the target environment data per predetermined cycle in operation 1615. For example, even if the first space already reached the temperature of 24 degrees, the electronic apparatus 100 may identify whether the temperature of the first space maintains 24 degrees per predetermined cycle (e.g., 10 minutes).

In case the subject space did not reach the target environment data within the threshold time, the electronic apparatus 100 may identify the space that did not reach the target environment data in operation S1620. If the subject space is one space which is the first space in the operation S1605, the space identified in the operation S1620 may be the first space. However, if the subject spaces are at least two in the operation S1605, the electronic apparatus 100 may identify specific spaces that did not reach the target environment data among the plurality of spaces.

The reason that a space did not reach the target environment data may be because a problem occurred in the home appliance located in the space, or the performance of the home appliance is low. Accordingly, the electronic apparatus 100 may use the auxiliary home appliance 401 for performing a control operation for the identified space. For example, if the temperature of the first space does not reach the target, the electronic apparatus 100 may use the auxiliary home appliance 401 to circulate air in the first space.

Here, the electronic apparatus 100 may identify whether to move the auxiliary home appliance 401 to the identified space in operation S1625. If it is identified that the auxiliary home appliance 401 will be moved to the identified space, the electronic apparatus 100 may generate a control signal for moving the auxiliary home appliance 401 to the identified space, and transmit the generated control signal to the auxiliary home appliance 401 in operation S1630. Here, if it is identified that the auxiliary home appliance 401 will not be moved to the identified space, the electronic apparatus 100 may generate a control signal for performing an auxiliary operation in the current location without moving the auxiliary home appliance 401, and transmit the generated control signal to the auxiliary home appliance 401 in operation S1635.

FIG. 17 is a diagram for illustrating an operation of obtaining a photographed image through an auxiliary home appliance in case target data is not reached within a threshold time.

Referring to FIG. 17, the operations S1705, S1710, S1715, and S1720 may correspond to the operation S1605, S1610, S1615, and S1620 in FIG. 16, and thus overlapping explanation will be omitted.

After identifying a space that did not reach the target environment data, the electronic apparatus 100 may generate a control signal for moving the auxiliary home appliance 401 to the identified space, and transmit the generated control signal to the auxiliary home appliance 401 in operation S1725. Then, the electronic apparatus 100 may generate a control signal for photographing the identified space, and transmit the generated control signal to the auxiliary home appliance 401 in operation S1730. Here, the auxiliary home appliance 401 may photograph the identified space through the camera or the sensor included in the auxiliary home appliance 401 based on the control signal received from the electronic apparatus 100, and obtain a space image. Then, the auxiliary home appliance 401 may transmit the obtained space image to the electronic apparatus 100.

The electronic apparatus 100 may receive the space image from the auxiliary home appliance 401 in operation S1735. Then, the electronic apparatus 100 may analyze the reason that the identified space did not reach the target environment data based on the received space image. Specifically, the electronic apparatus 100 may analyze the space image, and identify the reason such as whether the window is opened, whether power of the home appliance is turned on, etc.

The electronic apparatus 100 may additionally provide the received space image to the user in operation S1740. Specifically, the electronic apparatus 100 may transmit the received space image to the user terminal 200, and the user terminal 200 may display the received space image on the display 240. The user may check the space image displayed on the user terminal 200 remotely, and resolve the problem. The operation S1740 may be automatically performed in the embodiment of FIG. 17, or may be performed only when the electronic apparatus 100 cannot identify the reason for the problem by itself.

Figure 18:
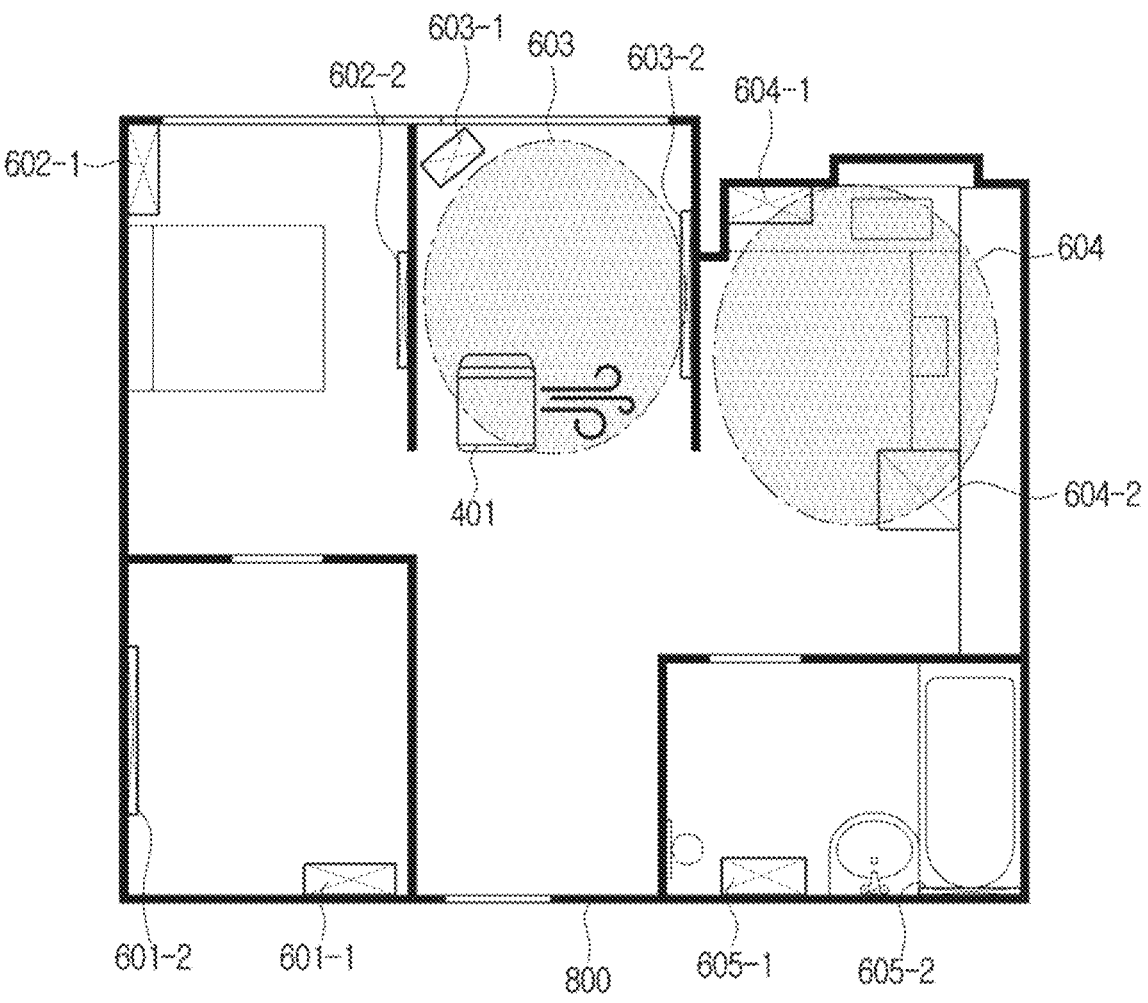
FIG. 18 is a diagram for illustrating an operation of determining a blowing direction and blowing strength of an auxiliary home appliance.

FIG. 18 is a diagram for illustrating an operation of determining a blowing direction and blowing strength of an auxiliary home appliance.

Referring to FIG. 18, the electronic apparatus 100 may perform an operation for controlling the entire home appliances in the space 800. For example, the home appliances 601-1, 602-1, 603-1, 604-1, 605-1 related to air among the plurality of appliances included in the IoT network 400 may be integrally controlled. Here, environment data (e.g., the temperature) corresponding to each of the plurality of spaces (601 to 605 in FIG. 6) included in the space 800 may be different, and the electronic apparatus 100 may transmit a control signal to the plurality of home appliances 601-1, 602-1, 603-1, 604-1, 605-1 to reach the environment data that fits each space.

Here, the space 604 may be a kitchen. In a kitchen, there is a high possibility that cooking utensils, etc. may be included, and thus there is a high possibility that a lot of heat is generated or a lot of fine dust is generated. Accordingly, in the space 604, an air conditioner or an air purifier may not be installed. Accordingly, the electronic apparatus 100 may determine to circulate air from the third space 603 to the fourth space 604 based on the space information.

Here, the electronic apparatus 100 may use the auxiliary home appliance 401 to circulate air. Here, the auxiliary home appliance 401 may be an air blowing device (e.g., a fan or a circulator) for moving the air strongly.

The electronic apparatus 100 may identify the blowing direction such that the auxiliary home appliance 401 blows wind from the third space 603 to the fourth space 604. Also, the electronic apparatus 100 may determine the blowing strength based on the distance between the spaces and the driving state information.

In the embodiment of FIG. 18, the auxiliary home appliance 401 may perform an auxiliary operation (a blowing operation) as it is located in the third space 603 without moving.

Figure 19:
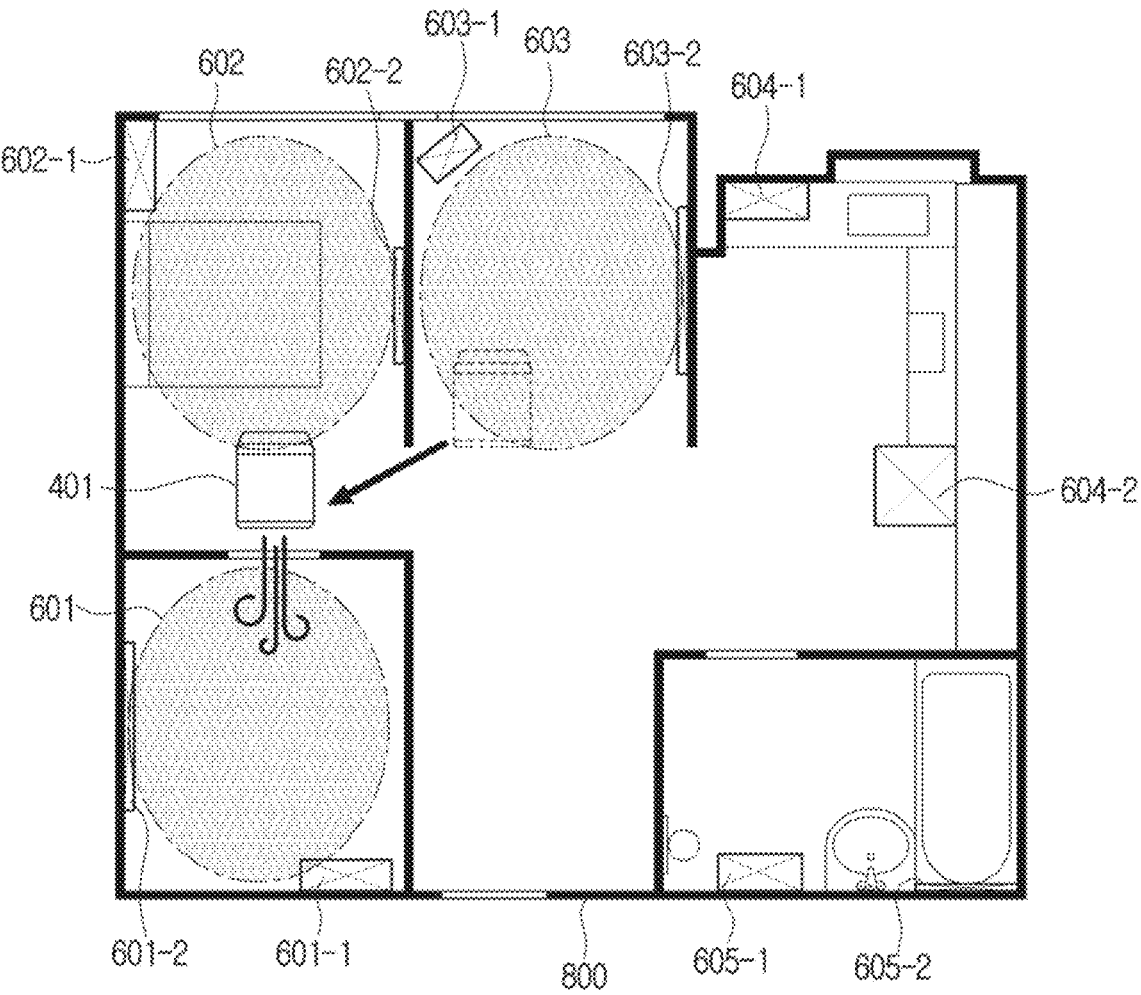
FIG. 19 is a diagram for illustrating an operation that an auxiliary home appliance moves.

FIG. 19 is a diagram for illustrating an operation that an auxiliary home appliance moves.

Referring to FIG. 19, the auxiliary home appliance 401 may perform an auxiliary operation after moving. Specifically, the electronic apparatus 100 may identify the optimal location of the auxiliary home appliance 401 for air circulation. The optimal location may be determined based on the structure information of the space 800. For example, it is assumed that air circulation is needed for the first space 601. The electronic apparatus 100 may identify the optimal location in the third space 603 which is the space in which the auxiliary home appliance 401 is currently located. Then, the electronic apparatus 100 may identify the blowing direction of the auxiliary home appliance 401 such that air is circulated from the second space 602 to the first space 601. Also, the electronic apparatus 100 may identify the blowing strength of the auxiliary home appliance 401 based on at least one of the space information or the driving state information.

The electronic apparatus 100 may transmit a control signal for controlling the auxiliary home appliance 401 based on the identified location, the identified blowing direction, and the identified blowing strength to the auxiliary home appliance 401.

Figure 20:
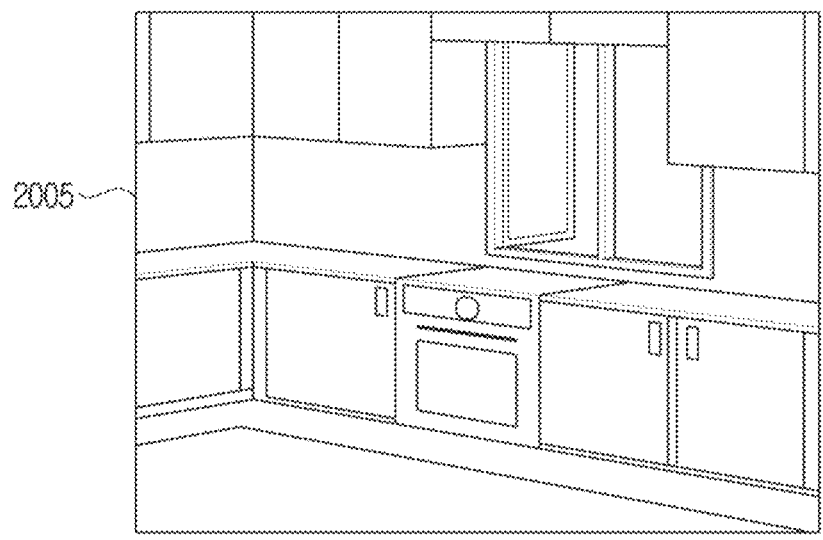
FIG. 20 is a diagram for illustrating a photographed image photographed by an auxiliary home appliance.

FIG. 20 is a diagram for illustrating a photographed image photographed by an auxiliary home appliance.

Referring to FIG. 20, the electronic apparatus 100 may obtain a space image 2005 for a space in which a problem occurred. Specifically, a space in which a problem occurred may mean a space that did not reach target environment data within a threshold time. For example, in the case of the first space in which the window is opened, the target temperature cannot be reached even if the air conditioner is operated. Accordingly, even if the threshold time passes, the target temperature is not reached in the first space, and the first space may be identified as a space in which a problem occurred.

The electronic apparatus 100 may transmit a control signal for controlling the auxiliary home appliance 401 to directly move and photograph the image of the space in which a problem occurred to the auxiliary home appliance 401. Then, the auxiliary home appliance 401 may move to the space in which a problem occurred based on the received control signal, and then obtain the space image 2005 by photographing the image of the space through the camera or the sensor.

Here, the electronic apparatus 100 may inform the user of whether a problem occurred, and transmit the space image 2005. Specifically, the electronic apparatus 100 may transmit the space image 2005 to the user terminal 200, and the user terminal 200 may display the received space image 2005 on the display 240.

The user may directly check the space image 2005, and may intuitively determine what kind of problem occurred in the space.

Figure 21:
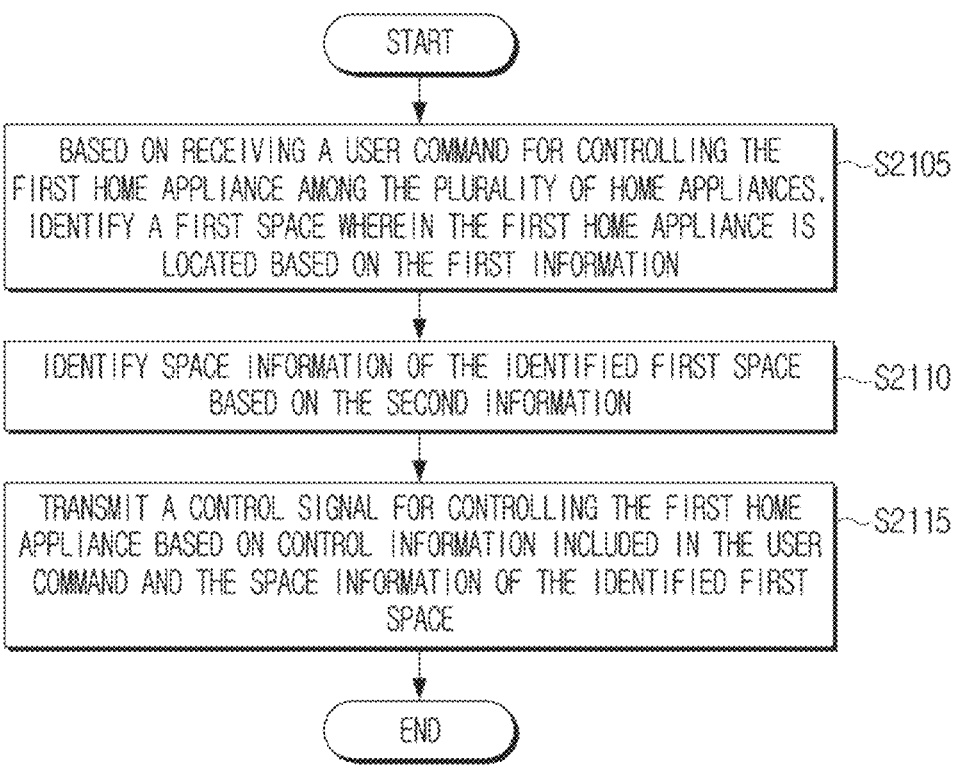
FIG. 21 is a diagram for illustrating a controlling method of an electronic apparatus according to an embodiment of the disclosure.

FIG. 21 is a diagram for illustrating a controlling method of an electronic apparatus according to an embodiment of the disclosure.

Referring to FIG. 21, in a controlling method of the electronic apparatus 100 storing first information on the plurality of home appliances 401, 601-1 to 605-2 included in the Internet of Things (IoT) network and second information on a plurality of spaces in which the plurality of home appliances 401, 601-1 to 605-2 are located according to an embodiment of the disclosure, if a user command for controlling a first home appliance among the plurality of home appliances 401, 601-1 to 605-2 is received, a first space in which the first home appliance is located may be identified based on the first information in operation S2105.

Also, in the controlling method, space information of the identified first space may be identified based on the second information in operation S2110.

In addition, in the controlling method, a control signal for controlling the first home appliance may be transmitted to the first home appliance based on control information included in the user command and the space information of the identified first space in operation S2115.

The controlling method may further include the steps of identifying a second home appliance performing a function related to the first home appliance among the plurality of home appliances 401, 601-1 to 605-2 based on the received user command, identifying a second space in which the second home appliance is located based on the first information, identifying space information of the identified second space based on the second information, and transmitting a control signal for controlling the second home appliance to the second home appliance based on control information included in the user command and the space information of the identified second space.

The controlling method may further include the step of, based on receiving user occupancy information, identifying a third space in which the user is located on the basis of the received user occupancy information, and in the step of transmitting the control signal to the first home appliance, based on identifying that the first space and the third space are the same space, a control signal for controlling the first home appliance may be transmitted to the first home appliance on the basis of control information included in the user command, the space information of the identified first space, and the user's information.

The space information may include at least one of structure information of the plurality of spaces, arrangement information of the plurality of home appliances 401, 601-1 to 605-2, or use information of the plurality of spaces.

The first home appliance may be an air conditioner, and the controlling method may further include the step of transmitting a control signal for controlling at least one of a driving mode, a blowing direction, or blowing strength of the air conditioner to the air conditioner based on the structure information of the first space.

The electronic apparatus 100 may further store power efficiency information of the plurality of home appliances 401, 601-1 to 605-2, and the controlling method may further include the steps of identifying a space in which a third home appliance of which power efficiency is smaller than or equal to a threshold value among the plurality of home appliances 401, 601-1 to 605-2, and identifying a fourth home appliance performing a function related to the third home appliance among home appliances located in spaces adjacent to the identified space, and transmitting a control signal for controlling the fourth home appliance to the fourth home appliance based on space information of the identified space and driving state information of the third home appliance.

The controlling method may further include the steps of, based on identifying that integrated control with another home appliance other than the first home appliance is needed based on the space information of the first space, identifying a fifth home appliance that is movable and performs a function related to the first home appliance among the plurality of home appliances 401, 601-1 to 605-2, and transmitting a control signal for controlling the fifth home appliance to the fifth home appliance based on the space information of the first space and driving state information of the first home appliance.

The controlling method may further include the step of transmitting a control signal for moving the fifth home appliance within a range of a threshold distance from the first space to the fifth home appliance based on the space information of the first space and location information of the fifth home appliance.

The controlling method may further include the step of, based on environment data of the first space not reaching environment data corresponding to the control signal within a threshold time, identifying that integrated control with another home appliance other than the first home appliance is needed.

The controlling method may further include the steps of transmitting a control signal for moving the fifth home appliance within a range of a threshold distance from the first space to the fifth home appliance based on the space information of the first space and location information of the fifth home appliance, transmitting a control signal for photographing the first space to the fifth home appliance, and based on receiving a photographed image from the fifth home appliance, transmitting the received photographed image to a user terminal.

The controlling method of an electronic apparatus as in FIG. 21 can be executed in an electronic apparatus having the configuration as in FIG. 2, and it can also be executed in electronic apparatuses having other configurations.

The methods according to the aforementioned various embodiments of the disclosure may be implemented in forms of applications that can be installed on conventional electronic devices.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of at least one of an electronic apparatus or a display apparatus.

According to an embodiment of the disclosure, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed online through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the aforementioned various embodiments may include a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
   a memory configured to store first information about a plurality of home appliances included in an Internet of Things (IoT) network and second information about a plurality of spaces in which the plurality of home appliances are located;
   a communication interface; and
   a processor configured to:
   based on a user command for controlling a first home appliance among the plurality of home appliances being received, identify, based on the first information, a first space in which the first home appliance is located,
   identify, based on the second information, space information of the first space, wherein the second information comprises structure information of the plurality of spaces,
   generate a control signal for controlling the first home appliance based on control information included in the user command and the space information of the first space,
   control the communication interface to transmit the control signal to the first home appliance,
   wherein the first information comprises at least one of identification information of the plurality of home appliances, location information of the plurality of home appliances, or power efficiency information of the plurality of home appliances, and
   wherein the processor is further configured to:
   obtain the control information included in the user command,
   change the control information included in the user command based on the space information of the first space, and
   generate the control signal for controlling the first home appliance based on the changed control information.

2. The electronic apparatus of claim 1, wherein the processor is further configured to:
   identify, based on the user command, a second home appliance performing a function related to the first home appliance, among the plurality of home appliances,
   identify, based on the first information, a second space in which the second home appliance is located,
   identify, based on the second information, space information of the second space, and
   control the communication interface to transmit a control signal for controlling the second home appliance to the second home appliance based on the control information included in the user command and the space information of the second space.

3. The electronic apparatus of claim 1, wherein the processor is further configured to:
   based on user occupancy information being received, identify a second space in which a user is located based on the user occupancy information, and
   based on identifying that the first space and the second space are a same space, control the communication interface to transmit the control signal for controlling the first home appliance to the first home appliance based on the control information included in the user command, the space information of the first space, and information of the user.

4. The electronic apparatus of claim 1, wherein the first home appliance is an air conditioner, and
   wherein the processor is further configured to control the communication interface to transmit a control signal for controlling at least one of a driving mode, a blowing direction, or blowing strength of the air conditioner to the air conditioner based on structure information of the first space.

5. The electronic apparatus of claim 1, wherein the memory is further configured to store the power efficiency information of the plurality of home appliances, and
   wherein the processor is further configured to:

identify a second space in which a second home appliance having a power efficiency that is less than or equal to a threshold value among the plurality of home appliances, identify a third home appliance performing a function related to the second home appliance among home appliances located in spaces adjacent to the second space, and control the communication interface to transmit a control signal for controlling the third home appliance to the third home appliance based on space information of the second space and driving state information of the second home appliance.

6. The electronic apparatus of claim 1, wherein the processor is further configured to:

based on identifying that integrated control with another home appliance other than the first home appliance is needed based on the space information of the first space, identify a second home appliance that is movable and performs a function related to the first home appliance among the plurality of home appliances, and control the communication interface to transmit a control signal for controlling the second home appliance to the second home appliance based on the space information of the first space and driving state information of the first home appliance.

7. The electronic apparatus of claim 6, wherein the processor is further configured to control the communication interface to transmit a control signal for moving the second home appliance within a range of a threshold distance from the first space to the second home appliance based on the space information of the first space and location information of the second home appliance.

8. The electronic apparatus of claim 6, wherein the processor is further configured to, based on environment data of the first space not reaching environment data corresponding to the control signal within a threshold time, identify that integrated control with another home appliance other than the first home appliance is needed.

9. The electronic apparatus of claim 8, wherein the processor is further configured to:

control the communication interface to transmit a control signal for moving the second home appliance within a range of a threshold distance from the first space to the second home appliance based on the space information of the first space and location information of the second home appliance, control the communication interface to transmit a control signal for photographing the first space to the second home appliance, and based on receiving a photographed image from the second home appliance, control the communication interface to transmit the photographed image to a user terminal.

10. A method of controlling an electronic apparatus storing first information about a plurality of home appliances included in an Internet of Things (IoT) network and second information about a plurality of spaces in which the plurality of home appliances are located, the method comprising:

based on a user command for controlling a first home appliance among the plurality of home appliances being received, identifying a first space in which the first home appliance is located based on of the first information;

identifying, based on the second information, space information of the first space, wherein the second information comprises structure information of the plurality of spaces;

generating a control signal for controlling the first home appliance based on control information included in the user command and the space information of the first space;

transmitting the control signal to the first home appliance, wherein the first information comprises at least one of identification information of the plurality of home appliances, location information of the plurality of home appliances, or power efficiency information of the plurality of home appliances, and wherein the generating the control signal comprises:

obtaining the control information included in the user command, changing the control information included in the user command based on the space information of the first space, and generating the control signal for controlling the first home appliance based on the changed control information.

11. The method of claim 10, wherein the method further comprises:

identifying, based on the user command, a second home appliance performing a function related to the first home appliance among the plurality of home appliances;

identifying, based on the first information, a second space in which the second home appliance is located;

identifying, based on the second information, space information of the second space; and transmitting a control signal for controlling the second home appliance to the second home appliance based on the control information included in the user command and the space information of the second space.

12. The method of claim 10, wherein the method further comprises:

based on user occupancy information being received, identifying a second space in which a user is located based on the user occupancy information, and the transmitting the control signal to the first home appliance comprises:

based on identifying that the first space and the second space are a same space, transmitting the control signal for controlling the first home appliance to the first home appliance based on the control information included in the user command, the space information of the first space, and information of the user.

13. The method of claim 10, wherein the first home appliance is an air conditioner, and wherein the method further comprises:

transmitting a control signal for controlling at least one of a driving mode, a blowing direction, or blowing strength of the air conditioner to the air conditioner based on structure information of the first space.

* * * * *